United States Patent [19]
Chen et al.

[11] Patent Number: 6,057,884
[45] Date of Patent: May 2, 2000

[54] TEMPORAL AND SPATIAL SCALEABLE CODING FOR VIDEO OBJECT PLANES

[75] Inventors: Xuemin Chen; Ajay Luthra; Ganesh Rajan; Mandayam Narasimhan, all of San Diego, Calif.

[73] Assignee: General Instrument Corporation, Horsham, Pa.

[21] Appl. No.: 08/869,493

[22] Filed: Jun. 5, 1997

[51] Int. Cl.[7] .................................................. H04N 7/32
[52] U.S. Cl. ..................... 348/416; 348/397; 348/398; 348/415; 348/438; 348/699; 382/243
[58] Field of Search ................................ 348/397–400, 348/402, 407–408, 412–413, 415–416, 438, 699–700; 382/242, 243, 236, 238, 244; H04N 7/32, 7/34, 7/36, 7/46

[56] References Cited

U.S. PATENT DOCUMENTS

| | | | |
|---|---|---|---|
| 5,686,956 | 11/1997 | Oh et al. | 348/416 |
| 5,692,063 | 11/1997 | Lee et al. | 382/107 |
| 5,757,971 | 5/1998 | Kim | 271/241 |
| 5,778,100 | 7/1998 | Chen et al. | 348/700 |
| 5,790,196 | 8/1998 | Sun et al. | 348/419 |
| 5,802,220 | 9/1998 | Black et al. | 382/276 |
| 5,805,736 | 9/1998 | Kim | 382/242 |

FOREIGN PATENT DOCUMENTS 0 639 031  2/1995  European Pat. Off. .

OTHER PUBLICATIONS

Tseng B. L. et al., "Compatible Video Coding of Stereoscopic Sequences Using MPEG–2's Scalability and Interlaced Structure," *Proceedings of the International Workshop on HDTV,* Oct. 26, 1994, pp. 369–378.

ISO–IEC JTC1/SC29/WG11 Video Subgroup: "ISO/IEC 13818–2 Amendment 3 (Multi–View Profile)," Sep. 1996, ISO/IEC, Chicago.

Sikora, "The MPEG–4 Video Standard Verification Model", IEEE Trans. on Circuits and Systems for Video Technology, vol. 7, No. 1, pp. 19–31, Feb. 1997.

Ferman et al, "Motion and Shape Signatures for Object–Based Indexing of MPEG–4 Compressed Video", IEEE, pp. 2601–2604, 1997.

Packwood et al, "Variable Size Block Matching Motion Compensation for Object–based Video Coupling", IEEE, pp. 56–60.

ISO/IEC JTC1/SC29/WG11 N2196, Coding of Moving Pictures and Audio, "Overview of the MPEG–4 Version 1 Standard", Mar. 1998.

Liu et al, "A JAVA–Based MPEG–4 Like Video Codec", IEEE Trans. on Consumer Electronics, vol. 44, No. 1, pp. 200–205, Feb. 1998.

Mulroy, "VRML Gets Real the MPEG–4 Way", Applied Research and Technology, BT Laboratories.

Lee et al., "A Layered Video Object Coding System Using Sprite and Affine Model", IEEE Trans. on Circuits and Systems for Video Technology, vol. 7, No. 1, pp. 130–145, Feb. 1997.

*Primary Examiner*—Vu Le
*Attorney, Agent, or Firm*—Barry R. Lipsitz; Ralph F. Hoppin

[57] ABSTRACT

Temporal and spatial scaling of video images including video object planes (VOPs) in an input digital video sequence is provided. Coding efficiency is improved by adaptively compressing scaled field mode video. Upsampled VOPs in the enhancement layer are reordered to provide a greater correlation with the input video sequence based on a linear criteria. The resulting residue is coded using a spatial transformation such as the DCT. A motion compensation scheme is used for coding enhancement layer VOPs by scaling motion vectors which have already been determined for the base layer VOPs. A reduced search area whose center is defined by the scaled motion vectors is provided. The motion compensation scheme is suitable for use with scaled frame mode or field mode video. Various processor configurations achieve particular scaleable coding results. Applications of scaleable coding include stereoscopic video, picture-in-picture, preview access channels, and ATM communications.

36 Claims, 8 Drawing Sheets

TEMPORAL AND SPATIAL SCALEABLE CODING FOR VIDEO OBJECT PLANES

BACKGROUND OF THE INVENTION

The present invention relates to a method and apparatus for providing temporal and spatial scaling of video images including video object planes in a digital video sequence. In particular, a motion compensation scheme is presented which is suitable for use with scaled frame mode or field mode video. A scheme for adaptively compressing field mode video using a spatial transformation such as the Discrete Cosine Transformation (DCT) is also presented.

The invention is particularly suitable for use with various multimedia applications, and is compatible with the MPEG-4 Verification Model (VM) 3.0 standard described in document ISO/IEC/JTC1/SC29/WG11 N1642, entitled "MPEG-4 Video Verification Model Version 7.0", April 1997, incorporated herein by reference. The invention can further provide coding of stereoscopic video, picture-in-picture, preview access channels, and asynchronous transfer mode (ATM) communications.

MPEG-4 is a new coding standard which provides a flexible framework and an open set of coding tools for communication, access, and manipulation of digital audio-visual data. These tools support a wide range of features. The flexible framework of MPEG-4 supports various combinations of coding tools and their corresponding functionalities for applications required by the computer, telecommunication, and entertainment (i.e., TV and film) industries, such as database browsing, information retrieval, and interactive communications.

MPEG-4 provides standardized core technologies allowing efficient storage, transmission and manipulation of video data in multimedia environments. MPEG-4 achieves efficient compression, object scalability, spatial and temporal scalability, and error resilience.

The MPEG-4 video VM coder/decoder (codec) is a block- and object-based hybrid coder with motion compensation. Texture is encoded with an 8×8 DCT utilizing overlapped block-motion compensation. Object shapes are represented as alpha maps and encoded using a Content-based Arithmetic Encoding (CAE) algorithm or a modified DCT coder, both using temporal prediction. The coder can handle sprites as they are known from computer graphics. Other coding methods, such as wavelet and sprite coding, may also be used for special applications.

Motion compensated texture coding is a well known approach for video coding. Such an approach can be modeled as a three-stage process. The first stage is signal processing which includes motion estimation and compensation (ME/MC) and a 2-D spatial transformation. The objective of ME/MC and the spatial transformation is to take advantage of temporal and spatial correlations in a video sequence to optimize the rate-distortion performance of quantization and entropy coding under a complexity constraint. The most common technique for ME/MC has been block matching, and the most common spatial transformation has been the DCT. However, special concerns arise for ME/MC and DCT coding of the boundary blocks of an arbitrarily shaped VOP.

The MPEG-2 Main Profile is a precursor to the MPEG-4 standard, and is described in document ISO/IEC JTC1/SC29/WG11 N0702, entitled "Information Technology—Generic Coding of Moving Pictures and Associated Audio, Recommendation H.262,11," March 25, 1994, incorporated herein by reference. Scalability extensions to the MPEG-2 Main Profile have been defined which provide for two or more separate bitstreams, or layers. Each layer can be combined to form a single high-quality signal. For example, the base layer may provide a lower quality video signal, while the enhancement layer provides additional information that can enhance the base layer image.

In particular, spatial and temporal scalability can provide compatibility between different video standards or decoder capabilities. With spatial scalability, the base layer video may have a lower spatial resolution than an input video sequence, in which case the enhancement layer carries information which can restore the resolution of the base layer to the input sequence level. For instance, an input video sequence which corresponds to the International Telecommunications Union—Radio Sector (ITU-R) 601 standard (with a resolution of 720×576 pixels) may be carried in a base layer which corresponds to the Common Interchange Format (CIF) standard (with a resolution of 360×288 pixels). The enhancement layer in this case carries information which is used by a decoder to restore the base layer video to the ITU-R 601 standard. Alternatively, the enhancement layer may have a reduced spatial resolution.

With temporal scalability, the base layer can have a lower temporal resolution (i.e., frame rate) than the input video sequence, while the enhancement layer carries the missing frames. When combined at a decoder, the original frame rate is restored.

Accordingly, it would be desirable to provide temporal and spatial scalability functions for coding of video signals which include video object planes (VOPs) such as those used in the MPEG-4 standard. It would be desirable to have the capability for coding of stereoscopic video, picture-in-picture, preview access channels, and asynchronous transfer mode (ATM) communications.

It would further be desirable to have a relatively low complexity and low cost codec design where the size of the search range is reduced for motion estimation of enhancement layer prediction coding of bi-directionally predicted VOPs (B-VOPs). It would also be desirable to efficiently code an interlaced video input signal which is scaled to base and enhancement layers by adaptively reordering pixel lines of an enhancement layer VOP prior to determining a residue and spatially transforming the data. The present invention provides a system having the above and other advantages.

SUMMARY OF THE INVENTION

In accordance with the present invention, a method and apparatus are presented for providing temporal and spatial scaling of video images such as video object planes (VOPs) in a digital video sequence. The VOPs can comprise a full frame and/or a subset of the frame, and may be arbitrarily shaped. Additionally, a plurality of VOPs may be provided in one frame or otherwise be temporally coincident.

A method is presented for scaling an input video sequence comprising video object planes (VOPs) for communication in a corresponding base layer and enhancement layer, where downsampled data is carried in the base layer. The VOPs in the input video sequence have an associated spatial resolution and temporal resolution (e.g., frame rate).

Pixel data of a first particular one of the VOPs of the input video sequence is downsampled to provide a first base layer VOP having a reduced spatial resolution. Pixel data of at least a portion of the first base layer VOP is upsampled to provide a first upsampled VOP in the enhancement layer. The first upsampled VOP is differentially encoded using the first particular one of the VOPs of the input video sequence, and provided in the enhancement layer at a temporal position corresponding to the first base layer VOP.

The differential encoding includes the step of determining a residue according to a difference between pixel data of the first upsampled VOP and pixel data of the first particular one of the VOPs of the input video sequence. The residue is spatially transformed to provide transform coefficients, for example, using the DCT.

When the VOPs in the input video sequence are field mode VOPS, the differential encoding involves reordering the lines of the pixel data of the first upsampled VOP in a field mode prior to determining the residue if the lines of pixel data meet a reordering criteria. The criteria is whether a sum of differences of luminance values of opposite-field lines (e.g., odd to even, and even to odd) is greater than a sum of differences of luminance data of same-field lines (e.g., odd to odd, and even to even) and a bias term.

The upsampled pixel data of the first base layer VOP may be a subset of the entire first base layer VOP, such that a remaining portion of the first base layer VOP which is not upsampled has a lower spatial resolution than the upsampled pixel data.

A second base layer VOP and upsampled VOP in the enhancement layer may be provided in a similar manner. One or both of the first and second base layer VOPs can be used to predict an intermediate VOP which corresponds to the first and second upsampled VOPs. The intermediate VOP is encoded for communication in the enhancement layer temporally between the first and second upsampled VOPs.

Furthermore, the enhancement layer may have a higher temporal resolution than the base layer when there is no intermediate base layer VOP between the first and second base layer VOPs.

In a specific application, the base and enhancement layer provide a picture-in-picture (PIP) capability where a PIP image is carried in the base layer, or a preview access channel capability, where a preview access image is carried in the base layer. In such applications, it is acceptable for the PIP image or free preview image to have a reduced spatial and/or temporal resolution. In an ATM application, higher priority, lower bit rate data may be provided in the base layer, while lower priority, higher bit rate data is provided in the enhancement layer. In this case, the base layer is allocated a guaranteed bandwidth, but the enhancement layer data may occasionally be lost.

A method is presented for scaling an input video sequence comprising video object planes (VOPs) where downsampled data is carried in the enhancement layer rather than the base layer. With this method, a first particular one of the VOPs of the input video sequence is provided in the base layer as a first base layer VOP, e.g., without changing the spatial resolution. Pixel data of at least a portion of the first base layer VOP is downsampled to provide a corresponding first downsampled VOP in the enhancement layer at a temporal position corresponding to the first base layer VOP. Corresponding pixel data of the first particular one of the VOPs is downsampled to provide a comparison VOP, and the first downsampled VOP is differentially encoded using the comparison VOP.

The base and enhancement layers may provide a stereoscopic video capability in which image data in the enhancement layer has a lower spatial resolution than image data in the base layer.

A method for coding a bi-directionally predicted video object plane (B-VOP) is also presented. First and second base layer VOPs are provided in the base layer which correspond to the input video sequence VOPs. The second base layer VOP is a P-VOP which is predicted from the first base layer VOP according to a motion vector $MV_P$. The B-VOP is provided in the enhancement layer temporally between the first and second base layer VOPs.

The B-VOP is encoded using at least one of a forward motion vector $MV_f$ and a backward motion vector $MV_B$ which are obtained by scaling the motion vector $MV_P$. This efficient coding technique avoids the need to perform an independent exhaustive search in the reference VOPs. A temporal distance $TR_P$ separates the first and second base layer VOPs, while a temporal distance $TR_B$ separates the first base layer VOP and the B-VOP.

A ratio m/n is defined as the ratio of the spatial resolution of the first and second base layer VOPs to the spatial resolution of the B-VOP. That is, either the base layer VOPs or the B-VOP in the enhancement layer may be downsampled relative to the VOPs of the input video sequence by a ratio m/n. It is assumed that either the base or enhancement layer VOP has the same spatial resolution as the input video sequence. The forward motion vector $MV_f$ is determined according to the relationship $MV_f=(m/n) \cdot TR_B \cdot MV_P/TR_P$, while the backward motion vector $MV_b$ is determined according to the relationship $MV_b=(m/n) \cdot (TR_B - TR_P) \cdot MV_P / TR_P$. m/n is any positive number, including fractional values.

The B-VOP is encoded using a search region of the first base layer VOP whose center is determined according to the forward motion vector $MV_f$, and a search region of the second base layer VOP whose center is determined according to the backward motion vector $MV_B$.

Corresponding decoder methods and apparatus are also presented.

DETAILED DESCRIPTION OF THE INVENTION

A method and apparatus are presented for providing temporal and spatial scaling of video images including video object planes (VOPs) in a digital video sequence.

Figure 1:
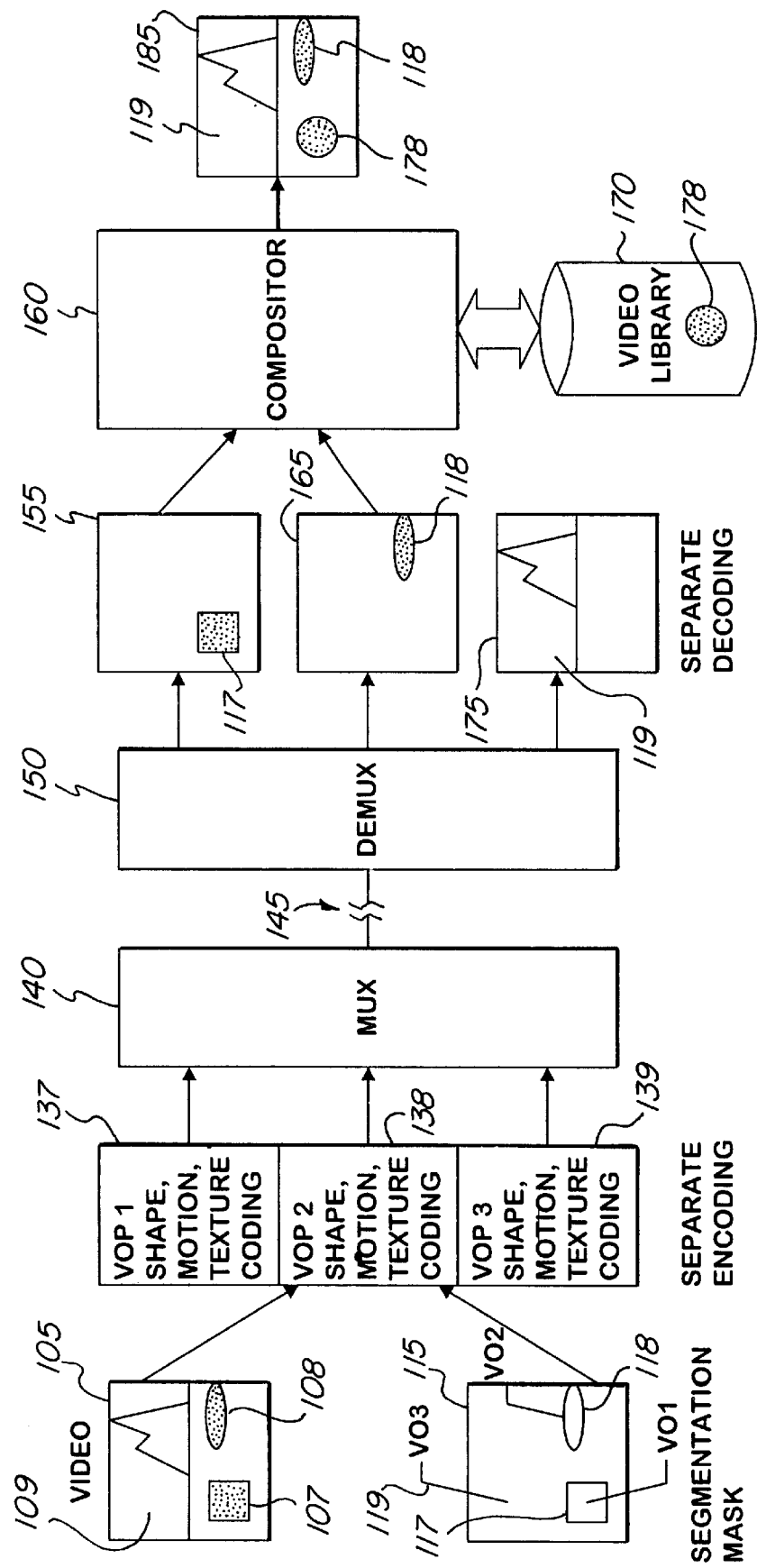
FIG. 1 is an illustration of a video object plane (VOP) coding and decoding process in accordance with the present invention.

FIG. 1 is an illustration of a video object coding and decoding process in accordance with the present invention. Frame 105 includes three pictorial elements, including a Square foreground element 107, an oblong foreground element 108, and a landscape backdrop element 109. In frame 115, the elements are designated VOPs using a segmentation mask such that VOP 117 represents the square foreground element 107, VOP 118 represents the oblong foreground element 108, and VOP 119 represents the landscape backdrop element 109. A VOP can have an arbitrary shape, and a succession of VOPs is known as a video object. A full rectangular video frame may also be considered to be a VOP. Thus, the term "VOP" will be used herein to indicate both arbitrary and non-arbitrary image area shapes. A segmentation mask is obtained using known techniques, and has a format similar to that of ITU-R 601 luminance data. Each pixel is identified as belonging to a certain region in the video frame.

The frame 105 and VOP data from frame 115 are supplied to separate encoding functions. In particular, VOPs 117, 118 and 119 undergo shape, motion and texture encoding at encoders 137, 138 and 139, respectively. With shape coding, binary and gray scale shape information is encoded. With motion coding, the shape information is coded using motion estimation within a frame. With texture coding, a spatial transformation such as the DCT is performed to obtain transform coefficients which can be variable-length coded for compression.

The coded VOP data is then combined at a multiplexer (MUX) 140 for transmission over a channel 145. Alternatively, the data may be stored on a recording medium. The received coded VOP data is separated by a demultiplexer (DEMUX) 150 so that the separate VOPs 117–119 are decoded and recovered. Frames 155, 165 and 175 show that VOPs 117, 118 and 119, respectively, have been decoded and recovered and can therefore be individually manipulated using a compositor 160 which interfaces with a video library 170, for example.

The compositor may be a device such as a personal computer which is located at a user's home to allow the user to edit the received data to provide a customized image. For example, the user's personal video library 170 may include a previously stored VOP 178 (e.g., a circle) which is different than the received VOPs. The user may compose a frame 185 where the circular VOP 178 replaces the square VOP 117. The frame 185 thus includes the received VOPs 118 and 119 and the locally stored VOP 178.

In another example, the background VOP 109 may be replaced by a background of the user's choosing. For example, when viewing a television news broadcast, the announcer may be coded as a VOP which is separate from the background, such as a news studio. The user may select a background from the library 170 or from another television program, such as a channel with stock price or weather information. The user can therefore act as a video editor.

The video library 170 may also store VOPs which are received via the channel 145, and may access VOPs and other image elements via a network such as the Internet.

It should be appreciated that the frame 105 may include regions which are not VOPs and therefore cannot be individually manipulated. Furthermore, the frame 105 need not have any VOPs. Generally, a video session comprises a single VOP, or a sequence of VOPs.

The video object coding and decoding process of FIG. 1 enables many entertainment, business and educational applications, including personal computer games, virtual environments, graphical user interfaces, videoconferencing, Internet applications and the like. In particular, the capability for spatial and temporal scaling of the VOPs in accordance with the present invention provides even greater capabilities.

Figure 2:
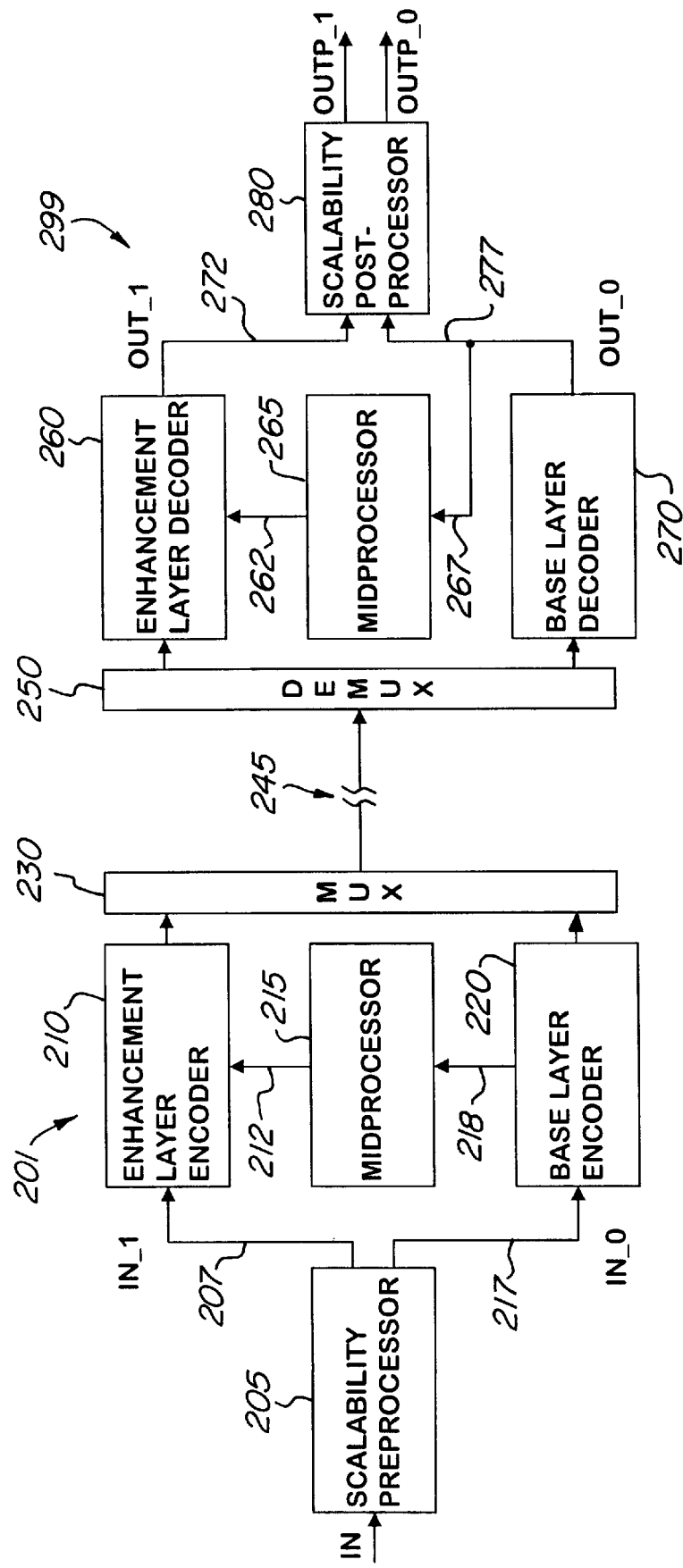
FIG. 2 is a block diagram of a VOP coder and decoder in accordance with the present invention.

FIG. 2 is a block diagram of a video object coder and decoder in accordance with the present invention. The encoder 201, which corresponds to elements 137–139 shown schematically in FIG. 1, includes a scalability preprocessor 205 which receives an input video data sequence "in". To achieve spatial scalability with the base layer having a lower spatial resolution than the enhancement layer, "in_0" is spatially downsampled to obtain the signal "in_0", which is, in turn, provided to a base layer encoder 220 via a path 217. "in_0" is encoded at the base layer encoder 220, and the encoded data is provided to a multiplexer (MUX) 230. A MPEG-4 System and Description Language (MSDL) MUX may be used.

Note that, when the input video sequence "in" is in field (interlaced) mode, the downsampled signal "in_0" will be in frame (progressive) mode since downsampling does not preserve the pixel data in even and odd fields. Of course, "in_0" will also be in frame mode when "in" is in frame mode.

The reconstructed image data is provided from the base layer encoder 220 to a midprocessor 215 via a path 218 which may perform pixel upsampling, as discussed below in greater detail in connection with FIG. 3. The upsampled image data, which is in frame mode, is then provided to an enhancement layer encoder 210 via a path 212, where it is differentially encoded using the input image data "in_1" provided from the preprocessor 205 to the encoder 210 via a path 207. In particular, the upsampled pixel data (e.g., luminance data) is subtracted from the input image data to obtain a residue, which is then encoded using the DCT or other spatial transformation.

Figure 6:
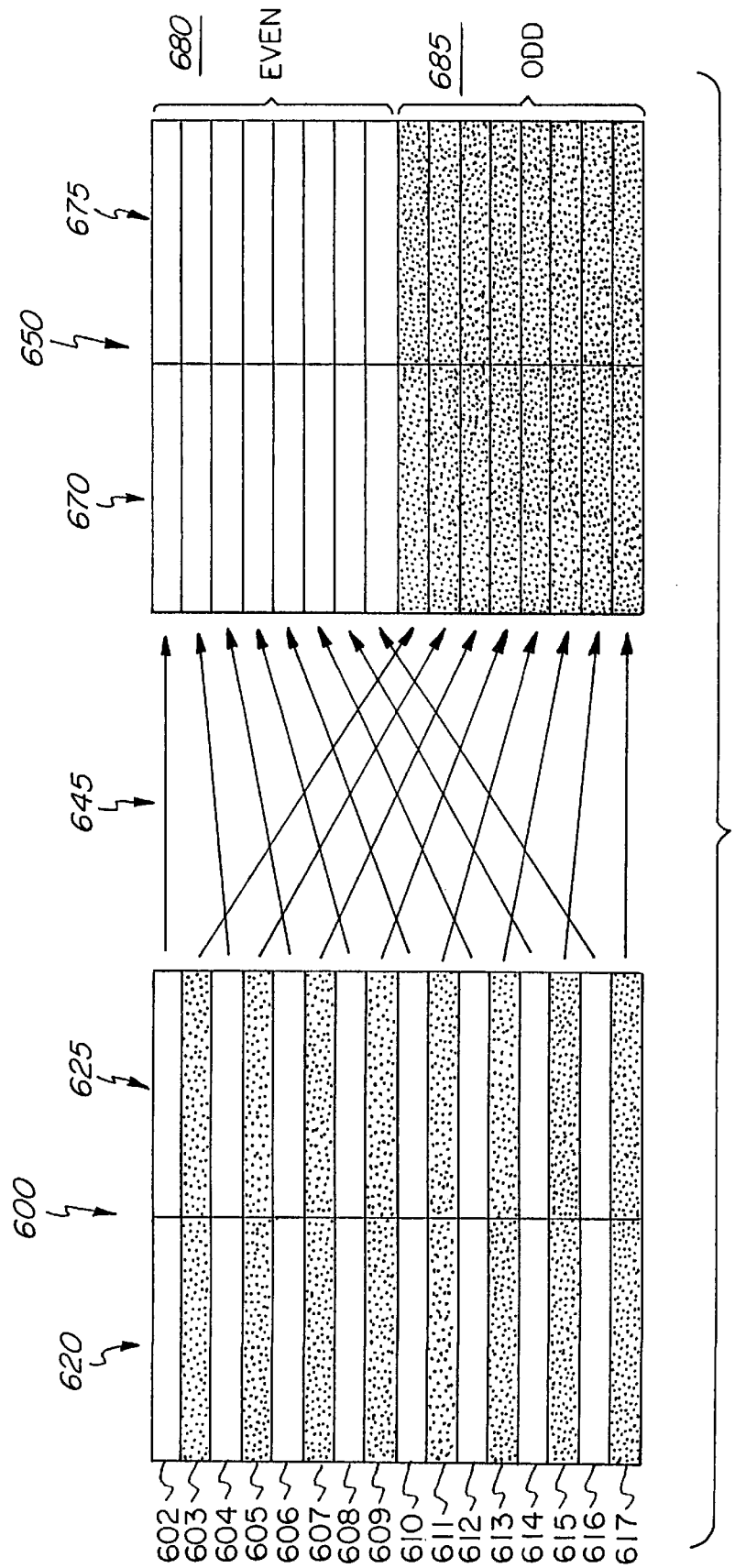
FIG. 6 illustrates the reordering of pixel lines from frame to field mode in accordance with the present invention.

In accordance with the present invention, when the input video sequence is in field mode, coding efficiency can be improved by grouping the pixel lines of the upsampled enhancement layer image which correspond to the original even (top) and odd (bottom) field of the input video sequence. This can decrease the magnitude of the residue in some cases since pixel data within a field will often have a greater correlation with other pixel data in the same field than with the data in the opposite field. Thus, by reducing the magnitude of the residue, fewer bits are required to code the image data. Refer to FIG. 6 and the associated discussion, below, for further details.

The encoded residue of the upsampled image in the enhancement layer is provided to the MUX 230 for transmission with the base layer data over a communication channel 245. The data may alternatively be stored locally. Note that the MUX 230, channel 245, and DEMUX 250 correspond, respectively, to elements 140, 145 and 150 in FIG. 1.

Note that the image data which is provided to the midprocessor 215 from the base layer encoder 220 may be the entire video image, such as a full-frame VOP, or a VOP which is a subset of the entire image. Moreover, a plurality of VOPs may be provided to the midprocessor 215. MPEG-4 currently supports up to 256 VOPs.

At a decoder 299, the encoded data is received at a demultiplexer (DEMUX) 250, such as an MPEG-4 MSDL DEMUX. The enhancement layer data, which has a higher spatial resolution than the base layer data in the present example, is provided to an enhancement layer decoder 260. The base layer data is provided to a base layer decoder 270, where the signal "out_0" is recovered and provided to a midprocessor 265 via a path 267, and to a scalability postprocessor 280 via a path 277. The midprocessor operates in a similar manner to the midprocessor 215 on the encoder side by upsampling the base layer data to recover a full-resolution image. This image is provided to the enhancement layer decoder 260 via a path 262 for use in recovering the enhancement layer data signal "out_1", which is then provided to the scalability postprocessor 280 via path 272. The scalability postprocessor 280 performs operations such as spatial upsampling of the decoded base layer data for display as signal "outp_0", while the enhancement layer data is output for display as signal "outp_1".

When the encoder 201 is used for temporal scalability, the preprocessor 205 performs temporal demultiplexing (e.g., pulldown processing or frame dropping) to reduce the frame rate, e.g., for the base layer. For example, to decrease the frame rate from 30 frames/sec. to 15 frames/sec., every other frame is dropped.

Table 1 below shows twenty-four possible configurations of the midprocessors 215 and 265, scalability preprocessor 205 and scalability postprocessor 280.

TABLE 1

| Configuration | Layer | Temporal Resolution | Spatial Resolution | Scalability Preprocessor | Midprocessor | Scalability Postprocessor |
|---|---|---|---|---|---|---|
| 1 | Base | Low(High) | Low | Downsample Filtering | Upsample Filtering | N/C |
|  | Enhancement | Low(High) | High | N/C | N/A | N/C |
| 2 | Base | Low | Low | Downsample Filtering and Pulldown Processing | Upsample Filtering | N/C |
|  | Enhancement | High | High | N/C | N/A | N/C |
| 3 | Base | High | Low | Downsample Filtering | Upsample Filtering | N/C |
|  | Enhancement | Low | High | Pulldown Processing | N/A | N/C |
| 4 | Base | Low(High) | High | N/C | Downsample Filtering | N/C |
|  | Enhancement | Low(High) | Low | Downsample Filtering | N/A | Upsample Filtering |
| 5 | Base | Low | High | Pulldown Processing | Downsample Filtering | N/C |
|  | Enhancement | High | Low | Downsample Filtering | N/A | Upsample Filtering |
| 6 | Base | High | High | N/C | Downsample Filtering | N/C |
|  | Enhancement | Low | Low | Downsample Filtering and Pulldown Processing | N/A | Upsample Filtering |
| 7 | Base | Low(High) | High | N/C | N/C | N/C |
|  | Enhancement | Low(High) | High | N/C | N/A | N/C |
| 8 | Base | Low | High | Pulldown Procossing | N/C | N/C |
|  | Enhancement | High | High | N/C | N/A | N/C |
| 9 | Base | High | High | N/C | N/C | N/C |
|  | Enhancement | Low | High | Pulldown Processing | N/A | N/C |
| 10 | Base | Low(High) | Low | Downsample Filtering | N/C | Upsample Filtering |
|  | Enhancement | Low(High) | Low | Downsample Filtering | N/A | Upsample Filtering |
| 11 | Base | Low | Low | Downsample Filtering and Pulldown Processing | N/C | Upsample Filtering |
|  | Enhancement | High | Low | Downsample Filtering | N/A | Upsample Filtering |
| 12 | Base | High | Low | Downsample Filtering | N/C | Upsample Filtering |
|  | Enhancement | Low | Low | Downsample Filtering and Pulldown Processing | N/A | Upsample Filtering |

| Configuration | Layer | Temporal Resolution | Spatial Resolution | Scalability Preprocessor | Midprocessor | Scalability Postprocessor |
|---|---|---|---|---|---|---|
| 7 | Base | Low (High) | High | N/C | N/C | N/C |
|  | Enhancement | Low (High) | High | N/C | N/A | N/C |
| 8 | Base | Low | High | Pulldown Processing | N/C | N/C |
|  | Enhancement | High | High | N/C | N/A | N/C |

-continued

| Configuration | Layer | Temporal Resolution | Spatial Resolution | Scalability Preprocessor | Midprocessor | Scalability Postprocessor |
|---|---|---|---|---|---|---|
| 9 | Base | High | High | N/C | N/C | N/C |
|  | Enhancement | Low | High | Pulldown Processing | N/A | N/C |
| 10 | Base | Low (High) | Low | Downsample Filtering | N/C | Upsample Filtering |
|  | Enhancement | Low (High) | Low | Downsample Filtering | N/A | Upsample Filtering |
| 11 | Base | Low | Low | Downsample Filtering and Pulldown Processing | N/C | Upsample Filtering |
|  | Enhancement | High | Low | Downsample Filtering | N/A | Upsample Filtering |
| 12 | Base | High | Low | Downsample Filtering | N/C | Upsample Filtering |
|  | Enhancement | Low | Low | Downsample Filtering and Pulldown Processing | N/A | Upsample Filtering |

In Table 1, the first column indicates the configuration number, the second column indicates the layer, and the third column indicates the temporal resolution of the layer (e.g., either high or low). When "Low(High)" is listed, the temporal resolution of the base and enhancement layers is either both high or both low. The fourth column indicates the spatial resolution. The fifth, sixth and seventh columns indicate the corresponding action of the scalability preprocessor 205, midprocessor 215 and 265, and scalability postprocessor 280. "N/C" denotes no change in temporal or spatial resolution, i.e., normal processing is performed. "N/A" means "not applicable." The midprocessor 215, 265 actions do not affect the enhancement layer.

Spatially scaled coding is illustrated using configuration 1 as an example. As discussed, when the scaleable coder 201 is used to code a VOP, the preprocessor 205 produces two substreams of VOPs with different spatial resolutions. As shown in Table 1, the base layer has a low spatial resolution, and the enhancement layer has a high spatial resolution which corresponds to the resolution of the input sequence. Therefore, the base-layer sequence "in_0" is generated by a downsampling process of the input video sequence "in" at the scalability preprocessor 205. The enhancement layer sequence is generated by upsample filtering of the downsampled base layer sequence at the midprocessors 215, 265 to achieve the same high spatial resolution of "in". The postprocessor 280 performs normal processing, i.e., it does not change the temporal or spatial resolution of "out_1" or "out_0".

For example, a base layer CIF resolution sequence (360× 288 pixels) can be generated from a 2:1 downsample filtering of an ITU-R 601 resolution input sequence (720×576 pixels). Downsampling by any integral or non-integral ratio may be used.

Temporally and spatially scaled coding is illustrated using configuration 2 as an example. Here, the input video sequence "in", which has a high spatial and temporal resolution, is converted to a base layer sequence having a low spatial and temporal resolution, and an enhancement layer sequence having a high spatial and temporal resolution. This is accomplished as indicated by Table 1 by performing downsample filtering and pulldown processing at the preprocessor 205 to provide the signal "in_0", with upsample filtering at the midprocessors 215, 265 and normal processing at the postprocessor 280.

With configuration 3, the input video sequence "in", which has a low or high temporal resolution, and a high spatial resolution, is converted to a base layer sequence having a corresponding low or high temporal resolution, and a high spatial resolution, and an enhancement layer sequence having a corresponding low or high temporal resolution, and a low spatial resolution. This is accomplished by performing downsample filtering for the enhancement layer sequence "in_1" at the preprocessor 205, with downsample filtering at the midprocessors 215, 265, and upsample filtering for the enhancement layer sequence "out_1" at the postprocessor 280.

The remaining configurations can be understood in view of the foregoing examples.

Figure 3:
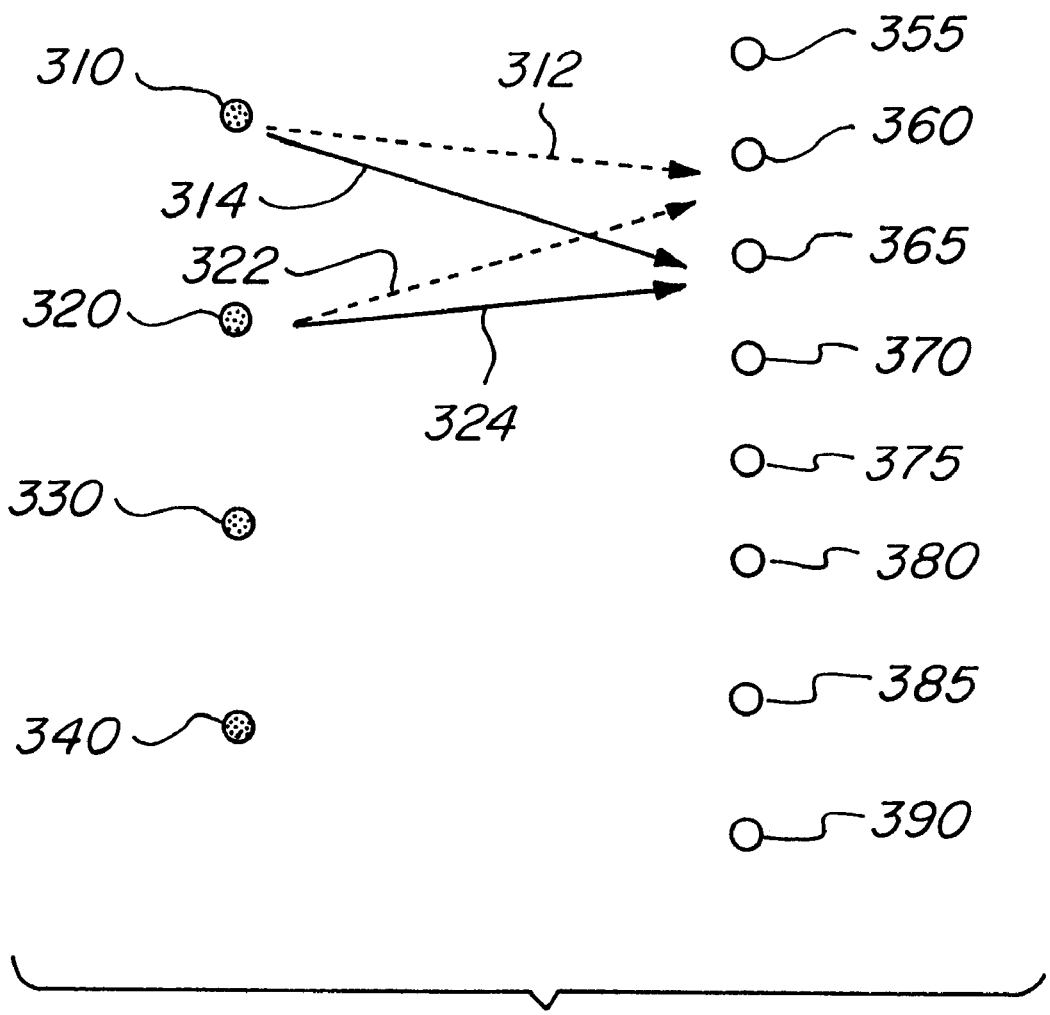
FIG. 3 is an illustration of pixel upsampling in accordance with the present invention.

FIG. 3 is an illustration of pixel upsampling in accordance with the present invention. Upsampling filtering may be performed by the midprocessors 215, 265 with configuration 1 of Table 1. For example, a VOP having a CIF resolution (360×288 pixels) can be converted to an ITU-R 601 resolution (720×576 pixels) with 2:1 upsampling. Pixels 310, 320, 330 and 340 of the CIF image are sampled to produce pixels 355, 360, 365, 370, 375, 380, 385 and 390 of the ITU-R 601 image. In particular, an ITU-R 601 pixel 360 is produced by sampling CIF pixels 310 and 320 as shown by arrows 312 and 322, respectively. Similarly, an ITU-R 601 pixel 365 is also produced by sampling CIF pixels 310 and 320, as shown by arrows 314 and 324, respectively.

Figure 4:
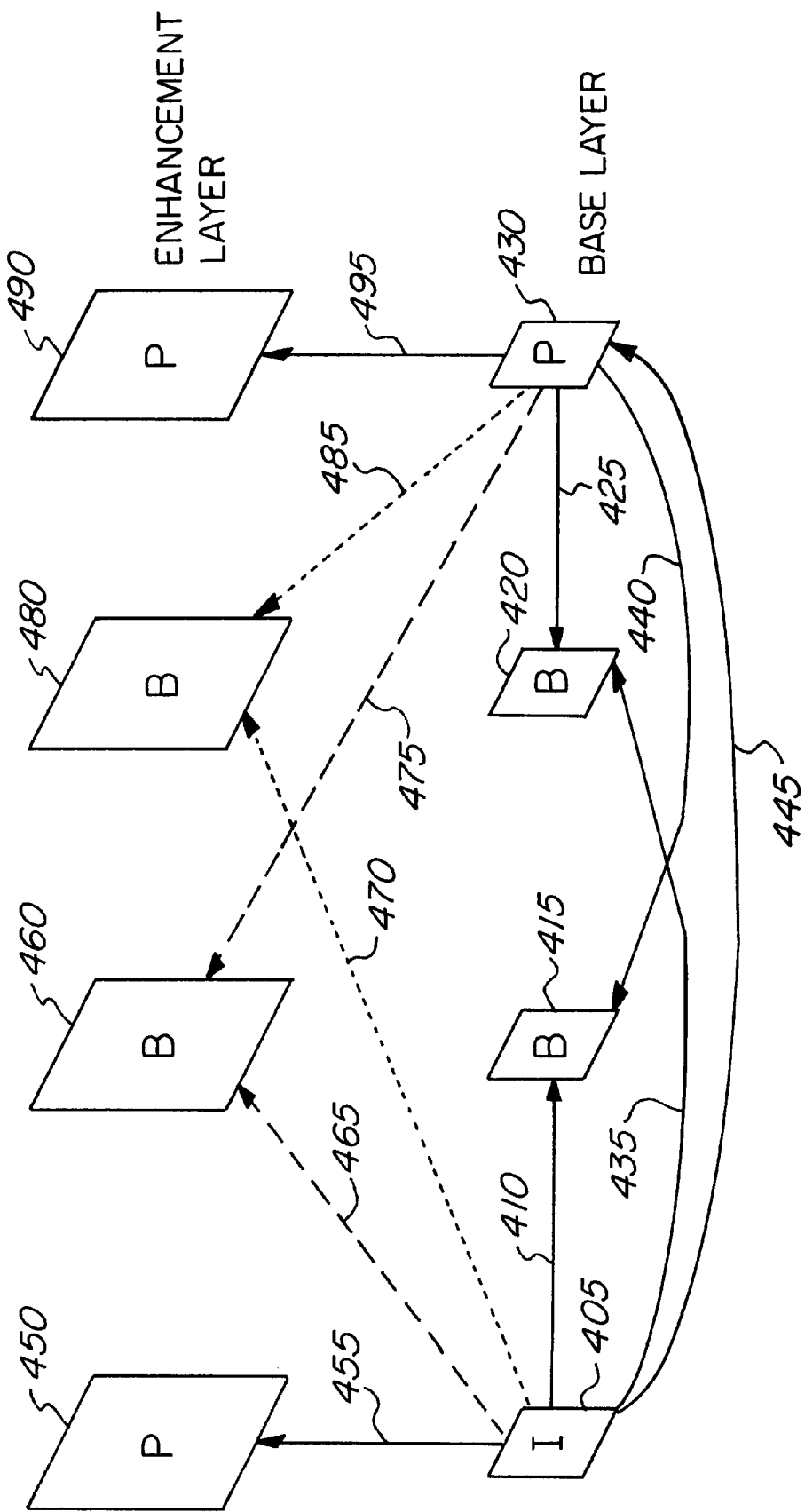
FIG. 4 is an illustration of an example of the prediction process between VOPs in a base layer and enhancement layer.

FIG. 4 is an illustration of an example of the prediction process between VOPs in the base layer and enhancement layer. In the enhancement layer encoder 210 of FIG. 2, a VOP of the enhancement layer is encoded as either a P-VOP or B-VOP. In this example, VOPs in the enhancement layer have a greater spatial resolution than base layer VOPs and are therefore drawn with a larger area. The temporal resolution (e.g., frame rate) is the same for both layers. The VOPs are shown in presentation order from left to right.

The base layer includes an I-VOP 405, B-VOPs 415 and 420, and a P-VOP 430. The enhancement layer includes P-VOPs 450 and 490, and B-VOPs 460 and 480. B-VOP 415 is predicted from other base layer VOPs as shown by arrows 410 and 440, while B-VOP 420 is also predicted from the other base layer VOPs as shown by arrows 425 and 435. P-VOP 430 is predicted from I-VOP 405 as shown by arrow 445. P-VOP 450 is derived by upsampling a base layer VOP indicated by arrow 455, while P-VOP 490 is derived from upsampling a base layer VOP indicated by arrow 495. B-VOP 460 is predicted from base layer VOPs as shown by arrows 465 and 475, and B-VOP 480 is predicted from base layer VOPs as shown by arrows 470 and 485.

Generally, the enhancement layer VOP which is temporally coincident (e.g., in display or presentation order) with an I-VOP in the base layer is encoded as a P-VOP. For example, VOP 450 is temporally coincident with I-VOP 405, and is therefore coded as a P-VOP. The enhancement layer VOP which is temporally coincident with a P-VOP in the base layer is encoded as either a P- or B-VOP. For example, VOP 490 is temporally coincident with P-VOP 430 and is coded as a P-VOP. The enhancement layer VOP which is temporally coincident with a B-VOP in the base layer is encoded as a B-VOP. For example, see B-VOPs 460 and 480.

I-VOP 405 and P-VOP 430 are known as anchor VOPs since they are used as prediction references for the enhancement layer VOPs. I-VOP 405 and P-VOP 430 are therefore coded before the encoding of the corresponding predicted VOPs in the enhancement layer. The prediction reference of a P-VOP in the enhancement layer is specified by the forward (prediction) temporal reference indicator forward_temporal_ref in an MPEG-4 compatible syntax. Such an indicator is a non-negative integer which points to the temporally coincided I-VOP in the base layer. The prediction references of B-VOPs in the enhancement layer are specified by ref_select_code, forward_temporal_ref and backward_temporal_ref. See Table 2, below. Note that the table is different for MPEG-2 and MPEG-4 VM 3.0 scalability schemes.

TABLE 2

| ref_select_code | forward temporal reference VOP | backward temporal reference VOP |
| --- | --- | --- |
| 00 | base layer | base layer |
| 01 | base layer | enhancement layer |
| 10 | enhancement layer | base layer |
| 11 | enhancement layer | enhancement layer |

Table 2 shows the prediction reference choices for B-VOPs in the enhancement layer. For example, assume that the temporal reference code temporal_ref for I-VOP 405 and P-VOP 430 in the base layer are 0 and 3, respectively. Also, let the temporal_ref for P-VOP 450 in the enhancement layer be 0. Then, in FIG. 4, forward_temporal ref=0 for P-VOP 450. The prediction references of B-VOPs 460 and 480, given by arrows 465 and 475, 470 and 485, respectively, are specified by ref_select_code=00, forward_temporal_ref=0, and backward_temporal_ref=3. The prediction references of P-VOP 490 are specified by ref_select_code=10, forward_temporal_ref=0 and backward_temporal_ref=3.

In coding both the base and enhancement layers, the prediction mode is indicated by a 2-bit word VOP_prediction_type given by Table 3, below.

TABLE 3

| VOP_prediction_type | Code |
| --- | --- |
| I | 00 |
| P | 01 |
| B | 10 |

An "I" prediction type indicates an intra-coded VOP, a "P" prediction type indicates a predicted VOP, and a "B" prediction type indicates a bi-directionally predicted VOP. The encoding process for the sequence "in_0" of the base layer is the same as a non-scaleable encoding process, e.g., according to the MPEG-2 Main profile or H.263 standard.

FIG. 6 illustrates the reordering, or permutation, of pixel lines from frame to field mode in accordance with the present invention. As mentioned, when an input VOP is in field mode and is downsampled, the resulting VOP will be in frame mode. Accordingly, when the downsampled image is spatially upsampled, the resulting VOP will also be in frame mode. However, when the upsampled VOP is differentially encoded by subtracting the input VOP from upsampled VOP, the resulting residue may not yield an optimal coding efficiency when a spatial transformation such as the DCT is subsequently performed on the residue. That is, is many cases, the magnitude of the residue values can be reduced by permuting (i.e., reordering) the lines of the upsampled image to group the even and odd lines since there may be a greater correlation between same-field pixels than opposite-field pixels.

An image which may represent upsampled pixel (e.g., luminance) data in an enhancement layer is shown generally at 600. For example, assume the image 600 is a 16×16 macroblock which is derived by 2:1 upsampling of an 8×8 block. The macroblock includes even numbered lines 602, 604, 606, 608, 610, 612, 614 and 616, and odd-numbered lines 603, 605, 607, 609, 611, 613, 615 and 617. The even and odd lines form top and bottom fields, respectively. The macroblock 600 includes four 8×8 luminance blocks, including a first block defined by the intersection of region 620 and lines 602–609, a second block defined by the intersection of region 625 and lines 602–609, a third block defined by the intersection of region 620 and lines 610–617, and a fourth block defined by the intersection of region 625 and lines 610–617.

When the pixel lines in image 600 are permuted to form same-field luminance blocks in accordance with the present invention prior to determining the residue and performing the DCT, the macroblock shown generally at 650 is formed. Arrows, shown generally at 645, indicate the reordering of the lines 602–617. For example, the even line 602, which is the first line of macroblock 600, is also the first line of macroblock 650. The even line 604 is made the second line in macroblock 650. Similarly, the even lines 606, 608, 610, 612, 614 and 616 are made the third through eighth lines, respectively, of macroblock 650. Thus, a 16×8 luminance region 680 with even-numbered lines is formed. A first 8×8 block is defined by the intersection of region 680 and 670, while a second 8×8 block is defined by the intersection of regions 680 and 675.

Similarly, the odd-numbered lines are moved to a 16×8 region 685. The region 685 comprises a first 8×8 block defined by the intersection of region 685 and 670, while a second 8×8 block is defined by the intersection of regions 685 and 675. Region 685 thus includes odd lines 603, 605, 607, 609, 611, 613, 615 and 617.

The DCT which is performed on the residue is referred to herein as either "field DCT" or "frame DCT" or the like according to whether or not the macroblock 600 is reordered as shown at macroblock 650. However, it should be appreciate that the invention may be adapted for use with other spatial transformations. When field DCT is used, the luminance lines (or luminance error) in the spatial domain of the macroblock are permuted from a frame DCT orientation to the top (even) and bottom (odd) field DCT configuration. The resulting macroblocks are transformed, quantized and variable length encoded normally. When a field DCT macroblock is decoded, the inverse permutation is performed after all luminance blocks have been obtained from the inverse DCT (IDCT). The 4:2:0 chrominance data is not effected by this mode.

The criteria for selecting field or frame mode DCT in accordance with the present invention is as follows. Field DCT should be selected when:

$$\sum_{i=0}^{6}\sum_{j=0}^{15}|p_{2i,j}-p_{2i+1,j}|+|p_{2i+1,j}-p_{2i+2,j}| >$$

$$\sum_{i=0}^{6}\sum_{j=0}^{15}|p_{2i,j}-p_{2i+2,j}|+|p_{2i+1,j}-p_{2i+3,j}|+bias$$

where $p_{i,j}$ is the spatial luminance difference (e.g., residue) data just before the DCT is performed on each of the 8×8 luminance blocks. Advantageously, the equation uses only first-order differences and therefore allows a simpler and less expensive implementation. The term "bias" is a factor which accounts for nonlinear effects which are not considered. For example, bias=64 may be used. If the above relationship does not hold, frame DCT is used.

Note that, in the left hand side of the above equation, the error terms refer to opposite-field pixel differences (e.g., even to odd, and odd to even). Thus, the left hand side is a sum of differences of luminance values of opposite-field lines. On the right hand side, the error terms are referring to same-field pixel differences (e.g., even to even, and odd to odd). Thus, the right hand side is a sum of differences of luminance data of same-field lines and a bias term.

Alternatively, a second order equation may be used to determine whether frame or field DCT should be used by modifying the above equation to take the square of each error term rather than the absolute value. In this case, the "bias" term is not required.

Figure 5:
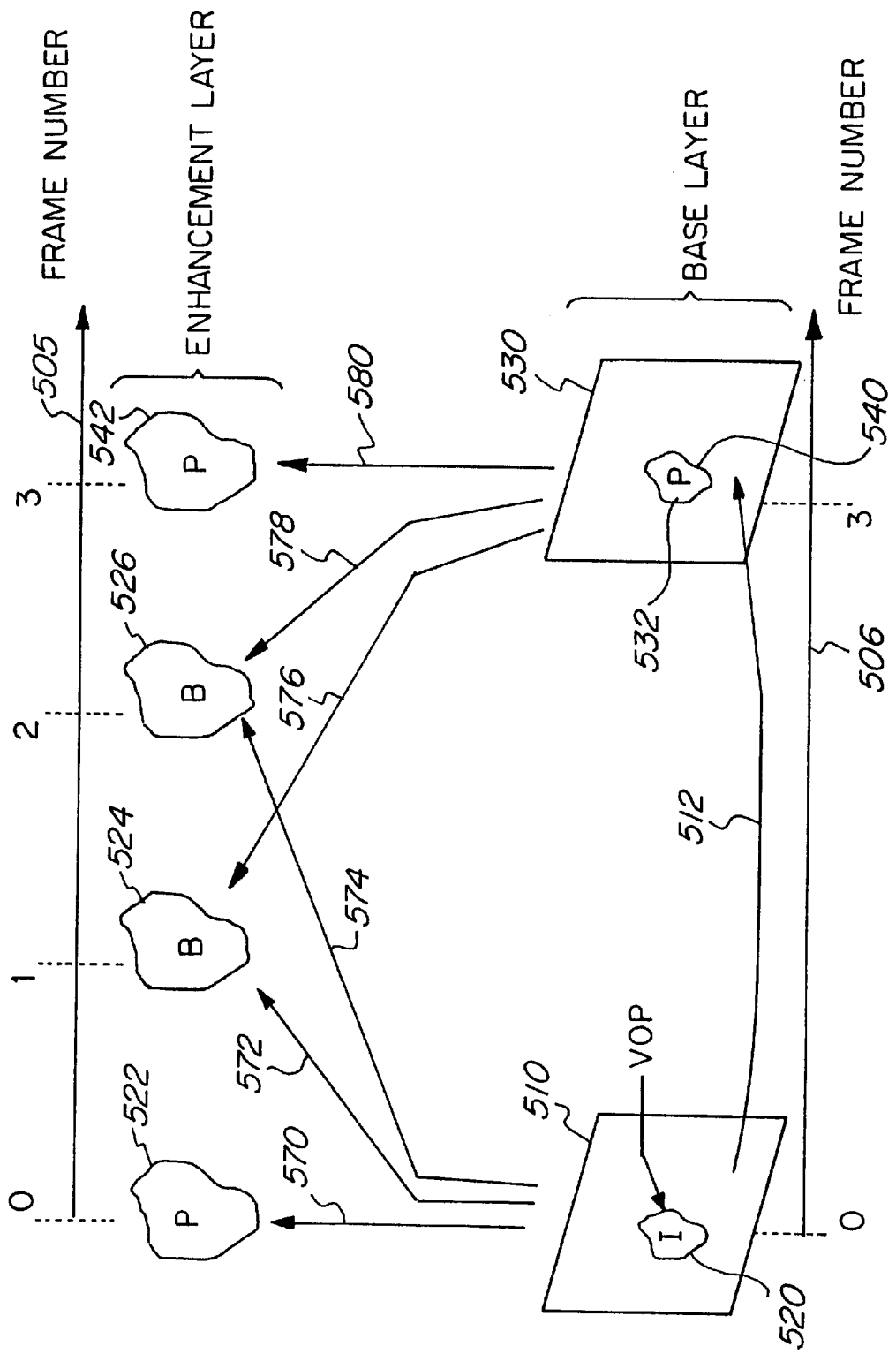
FIG. 5 is an illustration of spatial and temporal scaling of a VOP in accordance with the present invention.

FIG. 5 is an illustration of spatial and temporal scaling of a VOP in accordance with the present invention. With object-based scalability, the frame rate and spatial resolution of a selected VOP can be enhanced such that it has a higher quality than the remaining area, e.g., the frame rate and/or spatial resolution of the selected object can be higher than that of the remaining area. For example, a VOP of a news announcer may be provided with a higher resolution than a studio backdrop.

Axes 505 and 506 indicate a frame number. In the base layer, frame 510 which includes VOP 520 is provided in the frame 0 position, while frame 530 with VOP 532 (corresponding to VOP 520) is provided in the frame 3 position. Furthermore, frame 530 is predicted from frame 510, as shown by arrow 512. The enhancement layer includes VOPs 522, 524, 526 and 542. These VOPs have an increased spatial resolution relative to VOPs 520 and 532 and therefore are drawn with a larger area.

P-VOP 522 is derived from upsampling VOP 520, as shown by arrow 570. B-VOPs 524 and 526 are predicted from base layer VOPs 520 and 532, as shown by arrows 572 and 576, and 574 and 578, respectively.

The input video sequence which is used to create the base and enhancement layer sequences has full resolution (e.g. 720×480 for ITU-R 601 corresponding to National Television Standards Committee (NTSC) or 720×576 for ITU-R corresponding to Phase Alternation Line (PAL)) and full frame rate (30 frames/60 fields for ITU-R corresponding to NTSC or 25 frames/50 fields for ITU-R 601 corresponding to PAL). Scaleable coding is performed such that the resolution and frame rate of objects are preserved by using the enhancement layer coding. The video object in the base layer, comprising VOPs 520 and 532, has a lower resolution (e.g. quarter size of the full resolution VOP) and a lower frame rate (e.g. one third of the original frame rate).

Moreover, in the enhancement layer, only the VOP 520 is enhanced. The remainder of the frame 510 is not enhanced. While only one VOP is shown, virtually any number of VOPs may be provided. Moreover, when two or more VOPs are provided, all or only selected ones may be enhanced.

The base layer sequence is generated by down-sampling and frame-dropping of the original sequence. The base layer VOPs are then coded as I-VOPs or P-VOPs by using progressive coding tools. When the input video sequence is interlaced, interlaced coding tools such as field/frame motion estimation and compensation, and field/frame DCT are not used since downsampling of the input interlaced video sequence produces a progressive video sequence. The enhancement layer VOPs are coded using temporal and spatial scaleable tools. For example, in the enhancement layer, VOP 522 and VOP 542 are coded as P-VOPs using spatial scalability. VOP 524 and VOP 526 are coded as B-VOPs from the upsampled VOPs of the base layer reference VOPs, i.e., VOP 520 and VOP 532, respectively, using temporal scaleable tools.

In a further aspect of the present invention, a technique is disclosed for reducing encoding complexity for motion estimation of B-VOPs by reducing the motion vector search range. The technique is applicable to both frame mode and field mode input video sequences. In particular, the searching center of the reference VOP is determined by scaling the motion vector of the corresponding base layer VOP rather than by performing an independent exhaustive search in the reference VOP. Such as exhaustive search would typically cover a range, for example, of ±64 pixels horizontally, and ±48 pixels vertically, and would therefore be less efficient than the disclosed technique.

The searching center for motion vectors of B-VOPs 524 and 526 in the enhancement layer is determined by:

$$MV_f=(m/n\cdot TR_B\cdot MV_p)/TR_P,$$

$$MV_b=(m/n\cdot (TR_B-TR_P)\cdot MV_p)/TR_P,$$

where $MV_f$ is the forward motion vector, $MV_b$ is the backward motion vector, $MV_p$ is the motion vector for the P-VOP (e.g. VOP 532) in the base layer, $TR_B$ is the temporal distance between the past reference VOP (e.g., VOP 520) and the current B-VOP in the enhancement layer, and TRP is the temporal distance between the past reference VOP and the future reference P-VOP (e.g., VOP 532) in the base layer. m/n is the ratio of the spatial resolution of the base layer VOPs to the spatial resolution of the enhancement layer VOPs. That is, either the base layer VOPs or the B-VOP in the enhancement layer may be downsampled relative to the input video sequence by a ratio m/n. In the example of FIG. 5, m/n is the downsampling ratio of the base layer VOP which is subsequently upsampled to provide the enhancement layer VOP. m/n may be less than, equal to, or greater than one. For example, for B-VOP 524, $TR_B=1$, $TR_P=3$, and 2:1 downsampling (i.e., m/n=2), we have $MV_f=2/3\ MV_p$, and $MV_b=-4/3\ MV_p$. Note that all of the motion vectors are two-dimensional. The motion vector searching range is a 16×16 rectangular region, for example, whose center is determined by $MV_f$ and $MV_b$. The motion vectors are communicated with the enhancement and base layer video data in a transport data stream, and are recovered by a decoder for use in decoding the video data.

Generally, for coding of interlaced video in accordance with the present invention, interlaced coding tools are used to achieve better performance. These tools include Field/Frame DCT for intra-macroblocks and inter-difference macroblocks, and field prediction, i.e., top field to bottom field, top field to top field, bottom field to top field and bottom field to bottom field.

For the configurations described above in Table 1, above, these interlaced coding tools are combined as follows.

(1) For the configurations with low spatial resolution for both layers, only progressive (frame mode) coding tools are used. In this case, the two layers will code different view sequences, for example, in a stereoscopic video signal. For coding stereoscopic video, the motion estimation search range for the right-view (enhancement layer) sequence is 8×8 pixels. This 8×8 (full-pixel) search area is centered around the same-type motion vectors of a corresponding macroblock in the base layer of the corresponding VOP.

(2) For the configurations with low spatial resolution in the base layer and high spatial resolution in the enhancement layer, interlaced coding tools will only be used for the enhancement layer sequences. The motion estimation search range for coding the enhancement layer sequence is 8×8 (full-pixel). This 8×8 search area is centered around the re-scaled (i.e., a factor of two) same-type motion vectors of corresponding macroblock in the base layer of the corresponding VOP. Field based estimation and prediction will be used only in the enhancement layer search and compensation.

(3) For the configurations with high spatial resolution in the base layer and low spatial resolution in the enhancement layer, interlaced coding tools will only be used for the base layer sequences, as with the MPEG-2 Main Profile at the Main Level. The motion estimation search range for coding the enhancement layer sequence is 4×4 (full-pixel). This 4×4 search is centered around the re-scaled (i.e., a factor of ½) same-type motion vectors of corresponding macroblock in the base layer of the corresponding VOP. For configuration 2 in Table 1, above, for example, the coding of the sequences of two layers has a different temporal unit rate.

Figure 7:
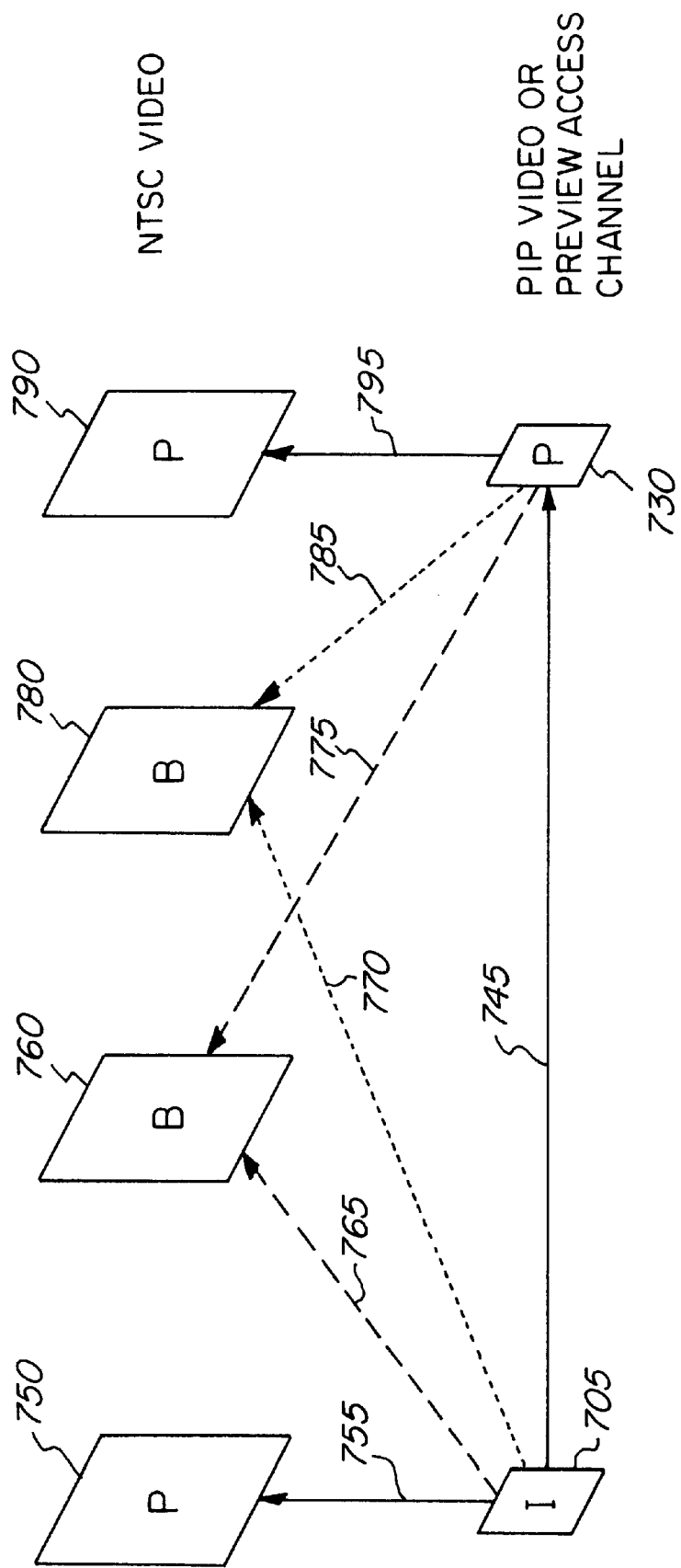
FIG. 7 is an illustration of a picture-in-picture (PIP) or preview channel access application with spatial and temporal scaling in accordance with the present invention.

FIG. 7 is an illustration of a picture-in-picture (PIP) or preview channel access application with spatial and temporal scaling in accordance with the present invention. With PIP, a secondary program is provided as a subset of a main program which is viewed on the television. Since the secondary program has a smaller area, the viewer is less discerning of a reduced resolution image, so the temporal and/or spatial resolution of the PIP image can be reduced to conserve bandwidth.

Similarly, a preview access channel program may provide a viewer with a free low-resolution sample of a program which may be purchased for a fee. This application provides a few minutes of free access of an authorized channel (e.g., Pay-Per-View) for a preview. Video coded in the preview access channel will have lower resolution and lower frame rate. The decoder will control the access time for such a preview channel.

Configuration 2 of the temporal-spatial scaleable coding in Table 1, above, may be used to provide an output from decoding the base layer that has a lower spatial resolution than the output from decoding both the base layer and the enhancement layer. The video sequence in the base layer can be coded with a low frame rate, while the enhancement layer is coded with a higher frame rate.

For example, a video sequence in the base layer can have a CIF resolution and a frame rate of 15 frames/second, while the corresponding video sequence in the enhancement layer has an ITU-R 601 resolution and a frame rate of 30 frames/second. In this case, the enhancement layer may conform to the NTSC video standard, while PIP or preview access functionality is provided by the base layer, which may conform to a CIF standard. Accordingly, PIP functionality can be provided by scaleable coding with a similar coding complexity and efficiency as the MPEG-2 Main Profile at Main Level standard.

The base layer includes low spatial resolution VOPs 705 and 730. Moreover, the temporal resolution of the base layer is ⅓ that of the enhancement layer. The enhancement layer includes high spatial resolution VOPs 750, 760, 780 and 790. P-VOP 750 is derived by upsampling I-VOP 705, as shown by arrow 755. B-VOP 760 is predicted from the base later VOPs as shown by arrows 765 and 775. B-VOP 780 is predicted from the base later VOPs as shown by arrows 770 and 785. P-VOP 790 is derived by upsampling P-VOP 730, as shown by arrow 795.

Figure 8:
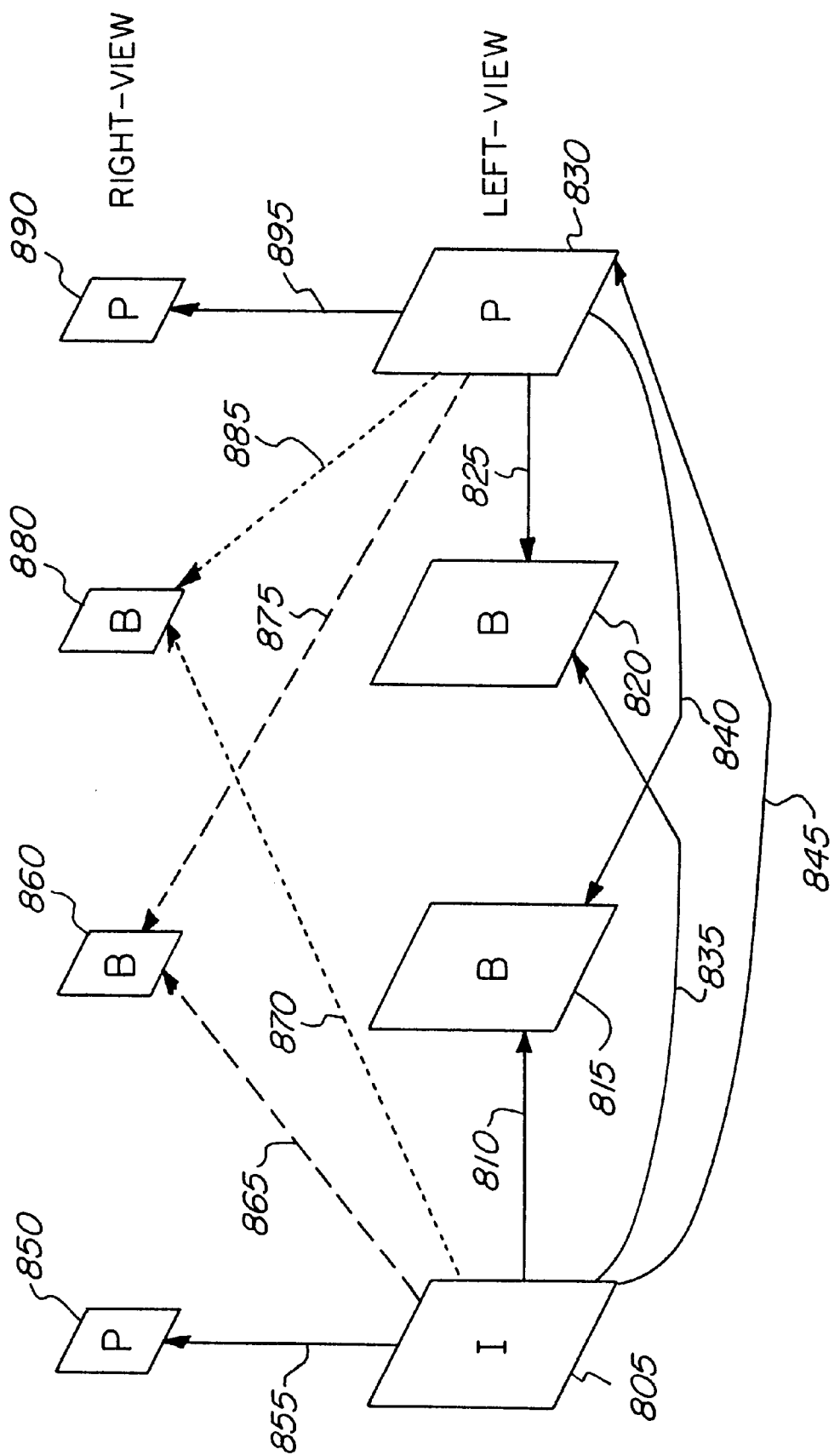
FIG. 8 is an illustration of a stereoscopic video application in accordance with the present invention.

FIG. 8 is an illustration of a stereoscopic video application in accordance with the present invention. Stereoscopic video functionality is provided in the MPEG-2 Multi-view Profile (MVP) system, described in document ISO/IEC JTC1/SC29/WG11 N1196. The base layer is assigned to the left view and the enhancement layer is assigned to the right view.

To improve coding efficiency, the enhancement layer pictures can be coded with a lower resolution than the base layer. For example, configuration 4 in Table 1, above, can be used where the base layer has a ITU-R 601 spatial resolution, while the enhancement layer has a CIF spatial resolution. The reference pictures of the base layer for the prediction of the enhancement layer pictures are downsampled. Accordingly, the decoder for the enhancement layer pictures includes an upsampling process. Additionally, adaptive frame/field DCT coding is used in the base layer but not the enhancement layer.

The base layer includes VOPs 805, 815, 820 and 830, while the enhancement layer includes VOPs 850, 860, 880 and 890. B-VOPs 815 and 820 are predicted using other base layer VOPs as shown by arrows 810, 840, and 835, 825, respectively. P-VOP 830 is predicted from I-VOP 805 as shown by arrow 845. P-VOP 850 is derived by downsampling I-VOP 805, as shown by arrow 855. B-VOP 860 is predicted from the base later VOPs as shown by arrows 865 and 875. B-VOP 880 is predicted from the base later VOPs as shown by arrows 870 and 885. P-VOP 890 is derived by downsampling P-VOP 830, as shown by arrow 895.

Alternatively, for the base and enhancement layers to have the same spatial resolution and frame rate, configuration 7 in Table 1, above, may be used. In this case, the coding process of the base layer may be the same as a non-scaleable encoding process, e.g., such as described in the MPEG-4 VM non-scaleable coding or MPEG-2 Main Profile at Main Level standard, while adaptive frame/field DCT coding is used in the enhancement layer.

In a further application of the present invention, an asynchronous transfer mode (ATM) communication technique is presented. Generally, the trend towards transmission of video signals over ATM networks is rapidly growing. This is due to the variable bit rate (VBR) nature of these networks which provides several advantages over constant bit rate (CBR) transmissions. For example, in VBR channels, an approximately constant picture quality can be achieved. Moreover, video sources in ATM networks can be statistically multiplexed, requiring a lower transmission bit rate than if they are transmitted through CBR channels since the long term average data rate of a video signal is less than the short term average due to elastic buffering in CBR systems.

However, despite the advantages of ATM networks, they suffer from a major deficiency of congestion. In congested networks, video packets are queued to find an outgoing route. Long-delayed packets may arrive too late to be of any use in the receiver, and consequently are thrown away by the decoder. The video codec then must be designed to withstand packet losses.

In order to make the video coder almost immune to packet losses, the temporal-spatial scaleable coding techniques of the present invention can be used. In particular, video data from the base layer can be transmitted with a high priority and accommodated in a guaranteed bit rate of an ATM network. Video data packets from the enhancement layer may be lost if congestion arises since a channel is not guaranteed. If the enhancement layer packets are received, picture quality is improved. A coding scheme using configuration 1 of Table 1, above, may be used to achieve this result. The scheme may be achieved as shown in FIG. 4, discussed previously in connection with prediction modes, where the base layer is the high-priority layer. Thus, higher priority, lower bit rate data is communicated in the base layer, and lower priority, higher bit rate data is communicated in the enhancement layer.

Similarly, such scaleable coding can also be used in video coding and transmission over the Internet, intranets and other communication networks.

Accordingly, it can be seen that the present invention provides a method and apparatus for providing temporal and spatial scaling of video images including video object planes (VOPs) in a digital video sequence. In one aspect of the invention, coding efficiency is improved by adaptively compressing a scaled field mode input video sequence. Upsampled VOPs in the enhancement layer are reordered to provide a greater correlation with the original video sequence based on a linear criteria. The resulting residue is coded using a spatial transformation such as the DCT. In another aspect of the invention, a motion compensation scheme is presented for coding enhancement layer VOPs by scaling motion vectors which have already been determined for the base layer VOPs. A reduced search area is defined whose center is defined by the scaled motion vectors. The technique is suitable for use with a scaled frame mode or field mode input video sequence.

Additionally, various codec processor configurations were presented to achieve particular scaleable coding results. Applications of scaleable coding, including stereoscopic video, picture-in-picture, preview access channels, and ATM communications, were also discussed.

Although the invention has been described in connection with various specific embodiments, those skilled in the art will appreciate that numerous adaptations and modifications may be made thereto without departing from the spirit and scope of the invention as set forth in the claims. For example, while two scalability layers were discussed, more than two layers may be provided. Moreover, while rectangular or square VOPs may have been provided in some of the figures for simplicity, the invention is equally suitable for use with arbitrarily-shaped VOPs.

What is claimed is:

1. A method for scaling an input video sequence comprising video object planes (VOPs) for communication in a corresponding base layer and enhancement layer, said VOPs in said input video sequence having an associated spatial resolution and temporal resolution, comprising the steps of:

downsampling pixel data of a first particular one of said VOPs of said input video sequence to provide a first base layer VOP having a reduced spatial resolution;

upsampling pixel data of at least a portion of said first base layer VOP to provide a first upsampled VOP in said enhancement layer;

differentially encoding said first upsampled VOP using said first particular one of said VOPs of said input video sequence for communication in said enhancement layer at a temporal position corresponding to said first base layer VOP;

downsampling pixel data of a second particular one of said VOPs of said input video sequence to provide a second base layer VOP having a reduced spatial resolution;

upsampling pixel data of at least a portion of said second base layer VOP to provide a second upsampled VOP in said enhancement layer which corresponds to said first upsampled VOP;

using at least one of said first and second base layer VOPs to predict an intermediate VOP corresponding to said first and second upsampled VOPs; and encoding said intermediate VOP for communication in said enhancement layer at a temporal position which is intermediate to that of said first and second upsampled VOPs.

2. The method of claim 1, wherein:

said enhancement layer has a higher temporal resolution than said base layer; and said base and enhancement layer are adapted to provide at least one of:
  (a) a picture-in-picture (PIP) capability wherein a PIP image is carried in said base layer, and
  (b) a preview access channel capability wherein a preview access image is carried in said base layer.

3. A method for scaling an input video sequence comprising video object planes (VOPs) for communication in a corresponding base layer and enhancement layer, said VOPs in said input video sequence having an associated spatial resolution and temporal resolution, comprising the steps of:

providing a first particular one of said VOPs of said input video sequence for communication in said base layer as a first base layer VOP;

downsampling pixel data of at least a portion of said first base layer VOP for communication in said enhancement layer as a first downsampled VOP at a temporal position corresponding to said first base layer VOP;

downsampling corresponding pixel data of said first particular one of said VOPs to provide a comparison VOP;

differentially encoding said first downsampled VOP using said comparison VOP;

differentially encoding said first base layer VOP using said first particular one of said VOPs by:
  determining a residue according to a difference between pixel data of said first base layer VOP and pixel data of said first particular one of said VOPs; and
  spatially transforming said residue to provide transform coefficients;
  wherein said VOPs in said input video sequence are field mode VOPs, and said first base layer VOP is differentially encoded by reordering lines of said pixel data of said first base layer VOP in a field mode prior to said determining step if said lines of pixel data meet a reordering criteria.

4. The method of claim 3, wherein:

said lines of pixel data of said first base layer VOP meet said reordering criteria when a sum of differences of luminance values of opposite-field lines is greater than a sum of differences of luminance data of same-field lines and a bias term.

5. A method for coding a bi-directionally predicted video object plane (B-VOP), comprising the steps of:

scaling an input video sequence comprising video object planes (VOPs) for communication in a corresponding base layer and enhancement layer;

providing first and second base layer VOPs in said base layer which correspond to said input video sequence VOPs;

said second base layer VOP being predicted from said first base layer VOP according to a motion vector $MV_p$;

providing said B-VOP in said enhancement layer at a temporal position which is intermediate to that of said first and second base layer VOPs; and encoding said B-VOP using at least one of:
(a) a forward motion vector $MV_f$ and
(b) a backward motion vector $MV_B$, obtained by scaling said motion vector $MV_p$.

6. The method of claim 5, wherein:

a temporal distance $TR_p$ separates said first and second base layer VOPs;

a temporal distance $TR_B$ separates said first base layer VOP and said B-VOP;

m/n is a ratio of the spatial resolution of the first and second base layer VOPs to the spatial resolution of the B-VOP; and at least one of:
(a) said forward motion vector $MV_f$ is determined according to the relationship $MV_f=(m/n)\cdot TR_B \cdot MV_p/TR_p$; and
(b) said backward motion vector $MV_b$ is determined according to the relationship $MV_b=(m/n)\cdot(TR_B-TR_p)\cdot MV_p/TR_p$.

7. The method of claim 5, comprising the further step of: encoding said B-VOP using at least one of:
(a) a search region of said first base layer VOP whose center is determined according to said forward motion vector $MV_f$; and
(b) a search region of said second base layer VOP whose center is determined according to said backward motion vector $MV_B$.

8. A method for recovering an input video sequence comprising video object planes (VOPs) which were scaled and communicated in a corresponding base layer and enhancement layer, said VOPs in said input video sequence having an associated spatial resolution and temporal resolution, wherein:

pixel data of a first particular one of said VOPs of said input video sequence is downsampled and carried as a first base layer VOP having a reduced spatial resolution;

pixel data of at least a portion of said first base layer VOP is upsampled and carried as a first upsampled VOP in said enhancement layer at a temporal position corresponding to said first base layer VOP; and said first upsampled VOP is differentially encoded using said first particular one of said VOPs of said input video sequence;

said method comprising the steps of:
upsampling said pixel data of said first base layer VOP to restore said associated spatial resolution; and
processing said first upsampled VOP and said first base layer VOP with said restored associated spatial resolution to provide an output video signal with said associated spatial resolution; wherein:
a second particular one of said VOPs of said input video sequence is downsampled to provide a second base layer VOP having a reduced spatial resolution;

pixel data of at least a portion of said second base layer VOP is upsampled to provide a second upsampled VOP in said enhancement layer which corresponds to said first upsampled VOP;

at least one of said first and second base layer VOPs is used to predict an intermediate VOP corresponding to said first and second upsampled VOPs; and said intermediate VOP is encoded for communication in said enhancement layer at a temporal position which is intermediate to that of said first and second upsampled VOPs.

9. The method of claim 8, wherein:

said enhancement layer has a higher temporal resolution than said base layer; and said base and enhancement layer are adapted to provide at least one of:
(a) a picture-in-picture (PIP) capability wherein a PIP image is carried in said base layer, and
(b) a preview access channel capability wherein a preview access image is carried in said base layer.

10. A method for recovering an input video sequence comprising video object planes (VOPs) which were scaled and communicated in a corresponding base layer and enhancement layer, said VOPs in said input video sequence having an associated spatial resolution and temporal resolution, wherein:

a first particular one of said VOPs of said input video sequence is provided in said base layer as a first base layer VOP;

pixel data of at least a portion of said first base layer VOP is downsampled and carried in said enhancement layer as a first downsampled VOP at a temporal position corresponding to said first base layer VOP;

corresponding pixel data of said first particular one of said VOPs is downsampled to provide a comparison VOP; and said first downsampled VOP is differentially encoded using said comparison VOP;

said method comprising the steps of:
upsampling said pixel data of said first downsampled VOP to restore said associated spatial resolution; and
processing said first enhancement layer VOP with said restored associated spatial resolution and said first base layer VOP to provide an output video signal with said associated spatial resolution; wherein:
said first base layer VOP is differentially encoded using said first particular one of said VOPs by determining a residue according to a difference between pixel data of said first base layer VOP and pixel data of said first particular one of said VOPs, and spatially transforming said residue to provide transform coefficients; and
said VOPs in said input video sequence are field mode VOPs, and said first base layer VOP is differentially encoded by reordering lines of said pixel data of said first base layer VOP in a field mode prior to determining said residue if said lines of pixel data meet a reordering criteria.

11. The method of claim 10, wherein:

said lines of pixel data of said first base layer VOP meet said reordering criteria when a sum of differences of luminance values of opposite-field lines is greater than a sum of differences of luminance data of same-field lines and a bias term.

12. A method for recovering an input video sequence comprising video object planes (VOPs) which was scaled and communicated in a corresponding base layer and enhancement layer in a data stream, said VOPs in said input video sequence having an associated spatial resolution and temporal resolution, wherein:

first and second base layer VOPs are provided in said base layer which correspond to said input video sequence VOPs;

said second base layer VOP is predicted from said first base layer VOP according to a motion vector $MV_B$;

a bi-directionally predicted video object plane (B-VOP) is provided in said enhancement layer at a temporal position which is intermediate to that of said first and second base layer VOPs; and said B-VOP is encoded using a forward motion vector $MV_f$ and a backward motion vector $MV_p$ which are obtained by scaling said motion vector $MV_p$;

said method comprising the steps of:
 recovering said forward motion vector $MV_f$ and said backward motion vector $MV_B$ from said data stream; and
 decoding said B-VOP using said forward motion vector $MV_f$ and said backward motion vector $MV_B$.

13. The method of claim 12, wherein:

a temporal distance $TR_p$ separates said first and second base layer VOPs;

a temporal distance $TR_B$ separates said first base layer VOP and said B-VOP;

m/n is a ratio of the spatial resolution of the first and second base layer VOPs to the spatial resolution of the B-VOP; and at least one of:
 (a) said forward motion vector $MV_f$ is determined according to the relationship $MV_f=(m/n)\cdot TR_B \cdot MV_p/TR_p$; and
 (b) said backward motion vector $MV_b$ is determined according to the relationship $MV_b=(m/n)\cdot(TR_B-TR_p)\cdot MV_p/TR_p$.

14. The method of claim 12, wherein:

said B-VOP is encoded using at least one of:
 (a) a search region of said first base layer VOP whose center is determined according to said forward motion vector $MV_f$; and
 (b) a search region of said second base layer VOP whose center is determined according to said backward motion vector $MV_B$.

15. A decoder apparatus for recovering an input video sequence comprising video object planes (VOPs) which were scaled and communicated in a corresponding base layer and enhancement layer, said VOPs in said input video sequence having an associated spatial resolution and temporal resolution, wherein:

pixel data of a first particular one of said VOPs of said input video sequence is downsampled and carried as a first base layer VOP having a reduced spatial resolution;

pixel data of at least a portion of said first base layer VOP is upsampled and carried as a first upsampled VOP in said enhancement layer at a temporal position corresponding to said first base layer VOP; and said first upsampled VOP is differentially encoded using said first particular one of said VOPs of said input video sequence;

said apparatus comprising:
 means for upsampling said pixel data of said first base layer VOP to restore said associated spatial resolution; and means for processing said first upsampled VOP and said first base layer VOP with said restored associated spatial resolution to provide an output video signal with said associated spatial resolution; wherein:
  said VOPs in said input video sequence are field mode VOPs; and
  said first upsampled VOP is differentially encoded by reordering lines of said pixel data of said first upsampled VOP in a field mode if said lines of pixel data meet a reordering criteria, then determining a residue according to a difference between pixel data of said first unsampled VOP and pixel data of said first particular one of said VOPs of said input video sequence, and spatially transforming said residue to provide transform coefficients.

16. The apparatus of claim 15, wherein:

said lines of pixel data of said first upsampled VOP meet said reordering criteria when a sum of differences of luminance values of opposite-field lines is greater than a sum of differences of luminance data of same-field lines and a bias term.

17. A decoder apparatus for recovering an input video sequence comprising video object planes (VOPs) which were scaled and communicated in a corresponding base layer and enhancement layer, said VOPs in said input video sequence having an associated spatial resolution and temporal resolution, wherein:

a first particular one of said VOPs of said input video sequence is provided in said base layer as a first base layer VOP;

pixel data of at least a portion of said first base layer VOP is downsampled and carried in said enhancement layer as a first downsampled VOP at a temporal position corresponding to said first base layer VOP;

corresponding pixel data of said first particular one of said VOPs is downsampled to provide a comparison VOP; and said first downsampled VOP is differentially encoded using said comparison VOP;

said apparatus comprising:
 means for upsampling said pixel data of said first downsampled VOP to restore said associated spatial resolution; and
 means for processing said first enhancement layer VOP with said restored spatial resolution and said first base layer VOP to provide an output video signal with said associated spatial resolution; wherein:
  said first downsampled VOP is differentially encoded by determining a residue according to a difference between pixel data of said first downsampled VOP and pixel data of said first particular one of said VOPs of said input video sequence, and spatially transforming said residue to provide transform coefficients; and
  said VOPs in said input video sequence are field mode VOPs, and said first base layer VOP is differentially encoded by reordering lines of said pixel data of said first base layer VOP in a field mode prior to determining said residue if said lines of pixel data meet a reordering criteria.

18. The apparatus of claim 17, wherein:

said lines of pixel data of said first base layer VOP meet said reordering criteria when a sum of differences of luminance values of opposite-field lines is greater than a sum of differences of luminance data of same-field lines and a bias term.

19. A decoder apparatus for recovering an input video sequence comprising video object planes (VOPs) which was scaled and communicated in a corresponding base layer and enhancement layer in a data stream, said VOPs in said input video sequence having an associated spatial resolution and temporal resolution, wherein:

first and second base layer VOPs which correspond to said input video sequence VOPs are provided in said base layer;

said second base layer VOP is predicted from said first base layer VOP according to a motion vector $MV_p$;

a bi-directionally predicted video object plane (B-VOP) is provided in said enhancement layer at a temporal position which is intermediate to that of said first and second base layer VOPs; and said B-VOP is encoded using a forward motion vector $MV_f$ and a backward motion vector $MV_B$ which are obtained by scaling said motion vector $MV_p$;

said apparatus comprising:

means for recovering said forward motion vector $MV_f$ and said backward motion vector $MV_B$ from said data stream; and means for decoding said B-VOP using said forward motion vector $MV_f$ and said backward motion vector $MV_B$.

20. The apparatus of claim 19, wherein:

a temporal distance $TR_p$ separates said first and second base layer VOPs;

a temporal distance $TR_B$ separates said first base layer VOP and said B-VOP;

m/n is a ratio of the spatial resolution of the first and second base layer VOPs to the spatial resolution of the B-VOP; and at least one of:
(a) said forward motion vector $MV_f$ is determined according to the relationship $MV_f=(m/n) \cdot TR_B \cdot MV_p/TR_p$; and
(b) said backward motion vector $MV_b$ is determined according to the relationship $MV_b=(m/n) \cdot (TR_B-TR_p) \cdot MV_p/TR_p$.

21. The apparatus of claim 19, wherein:

said B-VOP is encoded using at least one of:
(a) a search region of said first base layer VOP whose center is determined according to said forward motion vector $MV_f$; and
(b) a search region of said second base layer VOP whose center is determined according to said backward motion vector $MV_B$.

22. A method for scaling an input video sequence comprising video object planes (VOPs) for communication in a corresponding base layer and enhancement layer, said VOPs in said input video sequence having an associated spatial resolution and temporal resolution, comprising the steps of:

downsampling pixel data of a first particular one of said VOPs of said input video sequence to provide a first base layer VOP having a reduced spatial resolution;

upsampling pixel data of at least a portion of said first base layer VOP to provide a first upsampled VOP in said enhancement layer;

differentially encoding said first upsampled VOP using said first particular one of said VOPs of said input video sequence for communication in said enhancement layer at a temporal position corresponding to said first base layer VOP;

wherein said VOPs in said input video sequence are field mode VOPs, and said differentially encoding step comprises the further steps of:

reordering lines of said pixel data of said first upsampled VOP in a field mode if said lines of pixel data meet a reordering criteria; then determining a residue according to a difference between pixel data of said first upsampled VOP and pixel data of said first particular one of said VOPs of said input video sequence; and spatially transforming said residue to provide transform coefficients.

23. The method of claim 22, wherein:

said lines of pixel data of said first upsampled VOP meet said reordering criteria when a sum of differences of luminance values of opposite-field lines is greater than a sum of differences of luminance data of same-field lines and a bias term.

24. A method for scaling an input video sequence comprising video object planes (VOPs) for communication in a corresponding base layer and enhancement layer, said VOPs in said input video sequence having an associated spatial resolution and temporal resolution, comprising the steps of:

downsampling pixel data of a first particular one of said VOPs of said input video sequence to provide a first base layer VOP having a reduced spatial resolution;

upsampling pixel data of at least a portion of said first base layer VOP to provide a first upsampled VOP in said enhancement layer; and differentially encoding said first upsampled VOP using said first particular one of said VOPs of said input video sequence for communication in said enhancement layer at a temporal position corresponding to said first base layer VOP; wherein:

said base layer is adapted to carry higher priority, lower bit rate data, and said enhancement layer is adapted to carry lower priority, higher bit rate data.

25. A method for scaling an input video sequence comprising video object planes (VOPs) for communication in a corresponding base layer and enhancement layer, said VOPs in said input video sequence having an associated spatial resolution and temporal resolution, comprising the steps of:

providing a first particular one of said VOPs of said input video sequence for communication in said base layer as a first base layer VOP;

downsampling pixel data of at least a portion of said first base layer VOP for communication in said enhancement layer as a first downsampled VOP at a temporal position corresponding to said first base layer VOP;

downsampling corresponding pixel data of said first particular one of said VOPs to provide a comparison VOP;

differentially encoding said first downsampled VOP using said comparison VOP;

providing a second particular one of said VOPs of said input video sequence for communication in said base layer as a second base layer VOP;

downsampling pixel data of at least a portion of said second base layer VOP for communication in said enhancement layer as a second downsampled VOP at a temporal position corresponding to said second base layer VOP;

downsampling corresponding pixel data of said second particular one of said VOPs to provide a comparison VOP;

differentially encoding said second downsampled VOP using said comparison VOP;

using at least one of said first and second base layer VOPs to predict an intermediate VOP corresponding to said first and second downsampled VOPs; and encoding said intermediate VOP for communication in said enhancement layer at a temporal position which is intermediate to that of said first and second downsampled VOPs.

26. A method for scaling an input video sequence comprising video object planes (VOPs) for communication in a corresponding base layer and enhancement layer, said VOPs in said input video sequence having an associated spatial resolution and temporal resolution, comprising the steps of:

providing a first particular one of said VOPs of said input video sequence for communication in said base layer as a first base layer VOP;

downsampling pixel data of at least a portion of said first base layer VOP for communication in said enhancement layer as a first downsampled VOP at a temporal position corresponding to said first base layer VOP;

downsampling corresponding pixel data of said first particular one of said VOPs to provide a comparison VOP; and differentially encoding said first downsampled VOP using said comparison VOP; wherein:

the base and enhancement layers are adapted to provide a stereoscopic video capability in which image data in the enhancement layer has a lower spatial resolution than image data in the base layer.

27. A method for recovering an input video sequence comprising video object planes (VOPs) which were scaled and communicated in a corresponding base layer and enhancement layer, said VOPs in said input video sequence having an associated spatial resolution and temporal resolution, wherein:

pixel data of a first particular one of said VOPs of said input video sequence is downsampled and carried as a first base layer VOP having a reduced spatial resolution;

pixel data of at least a portion of said first base layer VOP is upsampled and carried as a first upsampled VOP in said enhancement layer at a temporal position corresponding to said first base layer VOP; and said first upsampled VOP is differentially encoded using said first particular one of said VOPs of said input video sequence;

said method comprising the steps of:

upsampling said pixel data of said first base layer VOP to restore said associated spatial resolution; and processing said first upsampled VOP and said first base layer VOP with said restored associated spatial resolution to provide an output video signal with said associated spatial resolution; wherein:

said VOPs in said input video sequence are field mode VOPs; and said first upsampled VOP is differentially encoded by reordering lines of said pixel data of said first upsampled VOP in a field mode if said lines of pixel data meet a reordering criteria, then determining a residue according to a difference between pixel data of said first upsampled VOP and pixel data of said first particular one of said VOPs of said input video sequence, and spatially transforming said residue to provide transform coefficients.

28. The method of claim 27, wherein:

said lines of pixel data of said first upsampled VOP meet said reordering criteria when a sum of differences of luminance values of opposite-field lines is greater than a sum of differences of luminance data of same-field lines and a bias term.

29. A method for recovering an input video sequence comprising video object planes (VOPs) which were scaled and communicated in a corresponding base layer and enhancement layer, said VOPs in said input video sequence having an associated spatial resolution and temporal resolution, wherein:

pixel data of a first particular one of said VOPs of said input video sequence is downsampled and carried as a first base layer VOP having a reduced spatial resolution;

pixel data of at least a portion of said first base layer VOP is upsampled and carried as a first upsampled VOP in said enhancement layer at a temporal position corresponding to said first base layer VOP; and said first upsampled VOP is differentially encoded using said first particular one of said VOPs of said input video sequence;

said method comprising the steps of:

upsampling said pixel data of said first base layer VOP to restore said associated spatial resolution; and processing said first upsampled VOP and said first base layer VOP with said restored associated spatial resolution to provide an output video signal with said associated spatial resolution; wherein:

said base layer is adapted to carry higher priority, lower bit rate data, and said enhancement layer is adapted to carry lower priority, higher bit rate data.

30. A method for recovering an input video sequence comprising video object planes (VOPs) which were scaled and communicated in a corresponding base layer and enhancement layer, said VOPs in said input video sequence having an associated spatial resolution and temporal resolution, wherein:

a first particular one of said VOPs of said input video sequence is provided in said base layer as a first base layer VOP;

pixel data of at least a portion of said first base layer VOP is downsampled and carried in said enhancement layer as a first downsampled VOP at a temporal position corresponding to said first base layer VOP;

corresponding pixel data of said first particular one of said VOPs is downsampled to provide a comparison VOP; and said first downsampled VOP is differentially encoded using said comparison VOP;

said method comprising the steps of:

upsampling said pixel data of said first downsampled VOP to restore said associated spatial resolution; and processing said first enhancement layer VOP with said restored associated spatial resolution and said first base layer VOP to provide an output video signal with said associated spatial resolution; wherein:

a second particular one of said VOPs of said input video sequence is provided in said base layer as a second base layer VOP;

pixel data of at least a portion of said second base layer VOP is downsampled and carried in said enhancement layer as a second downsampled VOP at a temporal position corresponding to said second base layer VOP;

corresponding pixel data of said second particular one of said VOPs is downsampled to provide a comparison VOP;

said second downsampled VOP is differentially encoded using said comparison VOP;

at least one of said first and second base layer VOPs is used to predict an intermediate VOP corresponding to said first and second downsampled VOPs; and said intermediate VOP is encoded for communication in said enhancement layer at a temporal position which is intermediate to that of said first and second downsampled VOPs.

31. A method for recovering an input video sequence comprising video object planes (VOPs) which were scaled and communicated in a corresponding base layer and enhancement layer, said VOPs in said input video sequence having an associated spatial resolution and temporal resolution, wherein:

a first particular one of said VOPs of said input video sequence is provided in said base layer as a first base layer VOP;

pixel data of at least a portion of said first base layer VOP is downsampled and carried in said enhancement layer as a first downsampled VOP at a temporal position corresponding to said first base layer VOP;

corresponding pixel data of said first particular one of said VOPs is downsampled to provide a comparison VOP; and said first downsampled VOP is differentially encoded using said comparison VOP;

said method comprising the steps of:

upsampling said pixel data of said first downsampled VOP to restore said associated spatial resolution; and processing said first enhancement layer VOP with said restored associated spatial resolution and said first base layer VOP to provide an output video signal with said associated spatial resolution; wherein:

said base and enhancement layer are adapted to provide a stereoscopic video capability in which image data in said enhancement layer has a lower spatial resolution than image data in said base layer.

32. A decoder apparatus for recovering an input video sequence comprising video object planes (VOPs) which were scaled and communicated in a corresponding base layer and enhancement layer, said VOPs in said input video sequence having an associated spatial resolution and temporal resolution, wherein:

pixel data of a first particular one of said VOPs of said input video sequence is downsampled and carried as a first base layer VOP having a reduced spatial resolution;

pixel data of at least a portion of said first base layer VOP is upsampled and carried as a first upsampled VOP in said enhancement layer at a temporal position corresponding to said first base layer VOP; and said first upsampled VOP is differentially encoded using said first particular one of said VOPs of said input video sequence;

said apparatus comprising:

means for upsampling said pixel data of said first base layer VOP to restore said associated spatial resolution; and means for processing said first upsampled VOP and said first base layer VOP with said restored associated spatial resolution to provide an output video signal with said associated spatial resolution; wherein:

a second particular one of said VOPs of said input video sequence is downsampled to provide a second base layer VOP having a reduced spatial resolution;

pixel data of at least a portion of said second base layer VOP is upsampled to provide a second upsampled VOP in said enhancement layer which corresponds to said first upsampled VOP;

at least one of said first and second base layer VOPs is used to predict an intermediate VOP corresponding to said first and second upsampled VOPs; and said intermediate VOP is encoded for communication in said enhancement layer at a temporal position which is intermediate to that of said first and second upsampled VOPs.

33. The apparatus of claim 32, wherein:

said enhancement layer has a higher temporal resolution than said base layer; and said base and enhancement layers are adapted to provide at least one of:

(a) a picture-in-picture (PIP) capability wherein a PIP image is carried in said base layer, and (b) a preview access channel capability wherein a preview access image is carried in said base layer.

34. A decoder apparatus for recovering an input video sequence comprising video object planes (VOPs) which were scaled and communicated in a corresponding base layer and enhancement layer, said VOPs in said input video sequence having an associated spatial resolution and temporal resolution, wherein:

pixel data of a first particular one of said VOPs of said input video sequence is downsampled and carried as a first base layer VOP having a reduced spatial resolution;

pixel data of at least a portion of said first base layer VOP is upsampled and carried as a first upsampled VOP in said enhancement layer at a temporal position corresponding to said first base layer VOP; and said first upsampled VOP is differentially encoded using said first particular one of said VOPs of said input video sequence;

said apparatus comprising:

means for upsampling said pixel data of said first base layer VOP to restore said associated spatial resolution; and means for processing said first upsampled VOP and said first base layer VOP with said restored associated spatial resolution to provide an output video signal with said associated spatial resolution; wherein:

said base layer is adapted to carry higher priority, lower bit rate data, and said enhancement layer is adapted to carry lower priority, higher bit rate data.

35. A decoder apparatus for recovering an input video sequence comprising video object planes (VOPs) which were scaled and communicated in a corresponding base layer and enhancement layer, said VOPs in said input video sequence having an associated spatial resolution and temporal resolution, wherein:

a first particular one of said VOPs of said input video sequence is provided in said base layer as a first base layer VOP;

pixel data of at least a portion of said first base layer VOP is downsampled and carried in said enhancement layer as a first downsampled VOP at a temporal position corresponding to said first base layer VOP;

corresponding pixel data of said first particular one of said VOPs is downsampled to provide a comparison VOP; and said first downsampled VOP is differentially encoded using said comparison VOP;

said apparatus comprising:
 means for upsampling said pixel data of said first downsampled VOP to restore said associated spatial resolution; and
 means for processing said first enhancement layer VOP with said restored spatial resolution and said first base layer VOP to provide an output video signal with said associated spatial resolution; wherein:
  a second particular one of said VOPs of said input video sequence is provided for communication in said base layer as a second base layer VOP;
  pixel data of at least a portion of said second base layer VOP is downsampled to provide a second downsampled VOP in said enhancement layer which corresponds to said first upsampled VOP;
  at least one of said first and second base layer VOPs is used to predict an intermediate VOP corresponding to said first and second downsampled VOPs; and
  said intermediate VOP is encoded for communication in said enhancement layer at a temporal position which is intermediate to that of said first and second downsampled VOPs.

36. A decoder apparatus for recovering an input video sequence comprising video object planes (VOPs) which were scaled and communicated in a corresponding base layer and enhancement layer, said VOPs in said input video sequence having an associated spatial resolution and temporal resolution, wherein:

a first particular one of said VOPs of said input video sequence is provided in said base layer as a first base layer VOP;

pixel data of at least a portion of said first base layer VOP is downsampled and carried in said enhancement layer as a first downsampled VOP at a temporal position corresponding to said first base layer VOP;

corresponding pixel data of said first particular one of said VOPs is downsampled to provide a comparison VOP; and said first downsampled VOP is differentially encoded using said comparison VOP;

said apparatus comprising:
 means for upsampling said pixel data of said first downsampled VOP to restore said associated spatial resolution; and
 means for processing said first enhancement layer VOP with said restored spatial resolution and said first base layer VOP to provide an output video signal with said associated spatial resolution; wherein:
  said base and enhancement layer are adapted to provide a stereoscopic video capability in which image data in said enhancement layer has a lower spatial resolution than image data in said base layer.

* * * * *